United States Patent
Zeng

(10) Patent No.: US 12,198,146 B2
(45) Date of Patent: Jan. 14, 2025

(54) METHOD AND SYSTEM FOR WOOD HARVEST AND STORAGE, CARBON SEQUESTRATION AND CARBON MANAGEMENT

(71) Applicant: Ning Zeng, Silver Spring, MD (US)

(72) Inventor: Ning Zeng, Silver Spring, MD (US)

( * ) Notice: Subject to any disclaimer, the term of this patent is extended or adjusted under 35 U.S.C. 154(b) by 237 days.

(21) Appl. No.: 17/663,433

(22) Filed: May 15, 2022

(65) Prior Publication Data

US 2022/0374912 A1 Nov. 24, 2022

Related U.S. Application Data

(60) Provisional application No. 63/189,184, filed on May 16, 2021.

(51) Int. Cl.
 *G06Q 30/00* (2023.01)
 *G06Q 10/04* (2023.01)
 *G06Q 10/0631* (2023.01)
 *G06Q 30/018* (2023.01)

(52) U.S. Cl.
 CPC .......... *G06Q 30/018* (2013.01); *G06Q 10/04* (2013.01); *G06Q 10/06313* (2013.01)

(58) Field of Classification Search
 None
 See application file for complete search history.

(56) References Cited

U.S. PATENT DOCUMENTS

| | | | | |
|---|---|---|---|---|
| 2005/0283428 | A1* | 12/2005 | Bartels | G06Q 40/04 705/37 |
| 2010/0040260 | A1* | 2/2010 | Kelle | G06V 20/188 382/110 |
| 2010/0145716 | A1* | 6/2010 | Zeng | G06Q 10/06 423/220 |
| 2012/0084193 | A1* | 4/2012 | Marino | G06Q 40/04 705/37 |

OTHER PUBLICATIONS

Temporally-differentiated biogenic carbon accounting of wood building product life cycles, Authors: Head, Marieke, et al., CIRAIG, Department of Mathematical and Industrial Engineering, École Polytechnique de Montréal . . . , Publication info: SN Applied Sciences 3.1 Springer Nature. (Jan. 2021) (Year: 2021).*
Potential carbon storage in biochar made from logging residue: Basic principles and Southern Oregon case studies, Authors: Campbell, John L. et al., Department of Forest Ecosystems and Society, Oregon State University, Publication info: PloS one 13.9: e0203475. (Sep. 13, 2018) (Year: 2018).*

(Continued)

*Primary Examiner* — Matthew T Sittner
(74) *Attorney, Agent, or Firm* — Syncoda LLC; Feng Ma

(57) ABSTRACT

A method for carbon sequestration and management through a wood storage project includes: determining source of wood used for storage for carbon sequestration with an optimization technique; preparing storage facilities (Wood Vaults) with an optimized ratio between carbon sequestration efficiency and cost; storing the sourced wood in the storage facilities; monitoring, evaluating, verifying and certifying carbon credit for the wood storage project; and conducting carbon credit trade for the wood storage project.

15 Claims, 26 Drawing Sheets

(56) References Cited

OTHER PUBLICATIONS

Quantifying and understanding carbon storage and sequestration within the Eastern Arc Mountains of Tanzania, a tropical biodiversity hotspot (vol. 9, 2, 2014), Authors: Willcock, Simon et al., Univ Leeds, Sch Geog, Publication info: Carbon Balance and Management 12 : 20. SPRINGEROPEN. (Dec. 7, 2017) (Year: 2017).*
Modeling the CO2-effects of forest management and wood usage on a regional basis, Authors: Knauf, Marcus et al., Publication info: Carbon balance and management 10.1 p. 13-13: p. 13. Springer International Publishing. (Dec. 2015) (Year: 2015).*

* cited by examiner

METHOD AND SYSTEM FOR WOOD HARVEST AND STORAGE, CARBON SEQUESTRATION AND CARBON MANAGEMENT

CROSS-REFERENCE TO RELATED APPLICATIONS

The present application claims priority to U.S. Provisional Patent Application No. 63/189,184 filed on May 16, 2021, the disclosure of which is hereby incorporated by reference in its entirety.

BACKGROUND

Atmospheric $CO_2$ concentration has increased from a pre-industrial value of 280 ppm to over 410 ppm today, mostly due to carbon emissions from fossil-fuel burning and deforestation. The Paris Climate Agreement envisions limiting global warming to significantly below 2° C. warming, which would require transformation in energy and economic structure, as well as novel technologies to keep atmospheric $CO_2$ concentration at a safe level.

SUMMARY

The present disclosure generally relates to methods and systems for wood harvesting and storage, carbon dioxide removal, carbon sequestration and management, and further relates to determining source of wood used for storage and optimizing wood sourcing from opportunistic sources and sustainably managed timberland or forest, transporting, treating and storing sourced wood underground, semi-above ground, above ground or in wet, cold, dry conditions in specially engineered structures called Wood Vaults, calculating amount of carbon contained in stored wood, monitoring, evaluating, verifying and certifying carbon credit for wood storage project and conducting carbon credit trade.

In an aspect, a method for carbon sequestration and management through a wood storage project is provided, including: determining source of wood used for storage for carbon sequestration with an optimization technique; preparing storage facilities (Wood Vaults) with an optimized ratio between carbon sequestration efficiency and cost; storing the sourced wood in the storage facilities; monitoring, evaluating, verifying and certifying carbon credit for the wood storage project; and conducting carbon credit trade for the wood storage project.

In some embodiments, the method for determining source of wood used for storage and optimizing wood sourcing further includes: determining forest wood source used for storage based on a time-dependent carbon accounting method. wherein, first, forest carbon storage is measured using a combination of traditional forest measurement techniques using the measurement diameter at breast height (DBH) and species-dependent bolometric equations, satellite observations of tree coverage, height and biomass, other targeted aerial observations from airplane or drone and ground observation with modern optical methods such as AI-assisted analysis of optical and infrared images, then, life cycle analysis (LCA) with the aid of carbon cycle model for the full accounting of each kind of operation is conducted. Parameters and input of LCA analysis is based on carbon cycle models that simulate forest growth for the specific species, calibrated with biomass growth data. Measurements of the growing forests or stored carbon is then merged with predictive model using data assimilation technique. The net carbon gain, that is, the stored carbon plus regrowing forest, subtract the baseline forest is used as the basis for carbon credit.

In some embodiments, the method for determining source of wood used for storage and optimizing wood sourcing further includes: determining opportunistic wood source used for storage based on its value for wood storage including carbon credit value, other co-benefits such as fire prevention, value for waste utilization and future usage exceeds its value for alternative usages such as making paper or lumber. Wherein, a carbon accounting method is provided, the carbon accounting method includes the following steps:

Step 1: First, a baseline is established. The baseline includes an assessment of the lifetime of the source wood. Half-life time and 5% decay time (95% stored) can be chosen as timescales, or other timescales can be chosen as well.

Step 2: Then lifetime of buried wood is assessed based on the storage method and environmental conditions. The lifetime can be broadly classified into a few categories: 1) stop-gap (<20 years), 2) short-term (20-100 years or a few decades), 3) long-term or semi-permanent (100-1000 years), 4) permanent (>1000 years), 5) ultra-permanent (>10,000 years).

Step 3: A model can then be developed, either as a single parameter model such as exponential decay.

$$C = C_0 \exp\left(-\frac{t}{\tau}\right)$$

wherein, C is the carbon pool size with initial value $C_0$, t is time and $\tau$ is the e-folding decay time scale. Or, depending on material and environment, some may be modeled using multi-parameter model with more realistic/sophisticated formulation, for example, a distributed model:

$$\frac{dC}{dt} = J(t) - \int_0^T J(t-\tau)\Gamma(\tau)d\tau$$

wherein, $\Gamma(\tau)$ is a gamma function and J is a continuous input added wood to the carbon pool. The parameter values will be based on the life-time estimates.

Step 4: The model can then be made to simulate continuously evolving carbon gain at any desired time interval.

In some embodiments, the method for optimizing wood sourcing and storage further includes a method for cost optimization, wherein, the basic principle can be expressed as a method to minimize a cost function J:

$$J(x,y)=J(x_1,x_2,x_3,\ldots,y1,y2,y3,\ldots)$$

Wherein, $x=x_1$, $x_2$, $x_3$, ... is a vector of multiple factors that impact the cost of sourcing wood, while $y=y_1$, $y_2$, $y_3$, ... is vector defining the total value of the forest, including value of the sequestered carbon, or alternative use for lumber or paper, co-benefits of fire prevention, each with its own value proportional to the amount allocated to that particular use.

Wherein, carbon storage in time relative to a baseline or other wood use methods, $y_1=y_1$ (species, climate factors, harvest frequency, regeneration strategy, fire prevention . . . )

This can be calculated using semi-empirical forest growth models, or more complex carbon cycle models. Or, forestry gap models can be used to simulate multi-species multi-age forest stand, useful for selective cutting strategy and better forest management.

The optimization procedure then uses the input of different usages and parameter values to find the best overall value relative to cost, that is, to minimize cost J. In simplified versions, this can be solved by taking the derivative of the cost function zero.

$$\frac{\partial J}{\partial x} = 0, \frac{\partial J}{\partial y} = 0$$

Wherein, iterative methods can be used to allow different sub-models to converge.

In some embodiments, the method for determining and optimizing wood sourcing further comprising a data assimilation method for carbon accounting, wherein, the data assimilation inputs are the observations $y^o$, the ensemble forecast $x_k^b(t)=M(x_k^a(t-1))$ with mean $\bar{x}^b$, and the forecast of the observation $y_k^b=h(x_k^b)$, where M represents the full nonlinear model, k is the index for model ensemble member, h is an 'observation operator' that 'maps' model prediction onto observation space in order to compute the observation model error covariance $y^o-h(x_k^b)$. This is an ensemble filter in which the observations are assimilated to update only the ensemble mean while the ensemble perturbations $x_k^b-\bar{x}^b$ are updated by transforming the forecast perturbations through a transform matrix:

$$\bar{x}^a=\bar{x}^b+X^b\tilde{P}^a(HX^b)^T R^{-1}[y^a-h(\bar{x}^b)]$$

$$X^a=X^b[(K-1)\tilde{P}^a]^{1/2}$$

Here K is the total number of ensemble members, $X^a$, $X^b$ are perturbation matrices whose columns are the analysis and forecast ensemble perturbations, respectively. $X^b$ is updated every analysis time step, therefore the forecast error covariance $$P^b = \frac{1}{K-1} X^b X^{bT}$$

is flow-dependent.

$\tilde{P}^a$, the analysis error covariance in ensemble space, is given by $$\tilde{P}^a=[(K-1)I+(HX^b)^T R^{-1}(HX^b)]^{-1}$$

which has dimension K by K, much smaller than both the dimension of the model and the number of observations. Thus, the algorithm performs the matrix inverse in the space spanned by the forecast ensemble members, which greatly reduces the computational cost.

In some embodiments, the method further includes: prior to the step of storing the wood, treating wood with chemical and physical methods through pressure treatment, liquid preserves or charring before wood is stored to prolong the preservation time.

In some embodiments, the method further includes a method for determine the sites and methods of wood storage based on a variety of conditions, taking into account interaction of these factors.

Wherein, the following formula is utilized to describe the factors influencing the rate of decomposition of stored wood, namely moisture, temperature, oxygen level, and surface area and served as basis for determining sites and methods of wood storage:

$$D=D_0 D_1(w) D_2(T) D_3(O) D_4(A)$$

where $D_0$ is the basic decomposition rate that is tree species dependent, while D1-D4 are relative or normalized.

The decomposition rate D is function of moisture w, temperature T, oxygen level O, and total surface area of buried wood A. These functions can be highly nonlinear and they can interact. For instance, at low moisture, decomposition rate is slow, then increases at higher moisture, but at extremely high moisture, i.e., water-logged condition, the interaction with oxygen then leads to reduced decomposition. While different mathematical functions can be used to model these behaviors, they need to represent the general relationships. Here, a set of specific forms are provided.

For moisture dependence, $$D_1(w) = \frac{d_0 + \exp\left(-\left(\frac{w_0 - w}{w_1}\right)^{n_1}\right)}{d_0 + 1}, \text{ if } w \leq w_0$$

$$= \frac{d_0 + \exp\left(-\left(\frac{w - w_0}{w_2}\right)^{n_2}\right)}{d_0 + 1}, \text{ if } w > w_0$$

For temperature dependence, $$D_2(T) = \exp\left(-\left(\frac{T_0 - T}{T_1}\right)^{n_1}\right), \text{ if } T \leq T_0$$

$$= \exp\left(-\left(\frac{T - T_0}{T_2}\right)^{n_2}\right), \text{ if } T > T_0$$

For both temperature and moisture dependence, the decomposition rate is small at low values, but reaches an optimal value of $w_0$ or $T_0$, and decreases at high values. This represents the general biological behavior that has an optimal condition at intermediate environmental conditions.

For dependence on oxygen level (O), we use a logistic function, $$D_3(O) = \frac{o^\alpha}{o_0^\alpha + o^\alpha}$$

where $O_0$ is ambient oxygen concentration at 21%, and a determines the sensitivity at extremely low oxygen values when decomposition rate is slow. The oxygen level itself depends on a range of conditions, in particular the hydrological state and how well the material is sealed.

Because the physical protection, the interior of a whole log is less accessible to decomposers. If the log is chopped into woodchips, the surface area would be much larger. Thus the 'wholeness' of the material is also an important factor. We formulate this as a dependence on exposed surface area A, $$D_4(A) = \left(\frac{A}{A_0}\right)^b$$

where, $A_0$ is the surface area of the original whole raw wood logs. Woodchips have a total surface area much larger than logs (A>>$A_0$) for the same mass, thus is more likely to decompose. Decomposition rate here is mass loss rate, and $D_4$ is relative to that of whole log. The exponent b represents the impact of effective surface area, and it is less or equal to 1. The exact value depends on how compact the material is, densely packed woodchip in clay soil would have less exposed effective area, thus smaller exposed surface area.

In some embodiments, the method further includes: burying wood underground in-situ on the forest floor, including:

burying wood directly under soil without sealing where soil texture is of low permeability and water level fluctuation and water flow are avoided and wood is placed either always under the water level, i.e., below the water level of the dry season or always above the water level, i.e., above the water level at the wet season; or, where water level fluctuation and water flow cannot be avoided, sealing wood burial chamber fully in clay, synthetic liner or other impermeable materials to avoid aeration and oxygenation; or, where wood is buried above the highest seasonable water table, sealing the top and upslope side of the wood burial chamber; or where wood is buried underground below water table but there is significant lateral flow due to topographical gradient or other causes as happens in mountainous, piedmont, or undulating hilly regions, sealing the upslope side of the wood burial chamber to divert the flow around or below the burial pile;

burying wood for carbon storage while driving log piles into muddy soil as foundations to support buildings, as a way to lower the cost of construction, for developing or renovating/raising cities such as Venice and New Orleans.

In some embodiments, the method further includes: burying wood semi-above ground on a slope in-situ on the forest floor, wherein, the up-slope side is cut to create room for wood burial and the top and the upslope side of the wood burial chamber are sealed with soil.

In some embodiments, the method further includes: burying wood above ground in-situ on the forest floor, wherein, a shelter with simple roof is constructed.

In some embodiments, the method further includes: building a large-scale storage facility off-site for above ground or semi-above ground storage. Wherein, the steps of building a large-scale burial facility for above ground or semi-above ground storage includes:

Step 1: selecting a suitable site of size commensurate the estimated sustainable rate of wood source from the anticipated surrounding regions. Wherein, the suitability of the site is based on assessment of site characteristics, including topography, hydrology, climate, environment, economics and other relevant factors.

Step 2: excavating soil to form a large pit, with the soil laid on the side. Top organic soil is further separated, which will be put back on top last. Several patterns of trench excavation are possible, including: (1) Long parallel strips with short width of 5-10 meters within arm's reach of the excavator which stays on the ground; (2) Large pit of arbitrary shape, with ramps going down to allow the excavator to dig deeper and deeper.

Step 3: dividing the pit into multiple sections (cells). wherein, the cell size is such that it can be filled, ideally in less than a year of the first dump, and the shorter the better. The optimal cell size is determined by balancing wood sourcing rate and engineering cost. A layer of soil or fire-resistant synthetic liner will cover each individual cell. Adjacent liners, as well as between liner and floor will be sealed. Different quality material can be separately buried in different cells as they may have different durability while being temporarily stored in a stockpile on site or nearby, for example, logs, woodchips, old furniture can be separated.

Step 4: transporting the wood material to fill the cell. In order to minimize any degradation before the closure of the cell, wood material of the same kind is trucked over and laid down in the same cell to fill it as quickly as possible, before moving on to the next cell.

Step 5: after fully filled, covering the section with a layer of soil which might be excavated local soil having a low permeability or soil having a low permeability sourced from outside and closed; or, piling up wood fully above ground without excavation where the water table is very shallow and fluctuates significantly; or, where the topographical slope is significant, lining the upslope-facing side to prevent water from moving laterally through the buried wood in order to minimize episodic reoxygenation of the burial environment. The base of the pit should be above the local water table at its highest level to avoid fluctuating water-air boundary bringing oxygen. If considering all factors for site selection, the water-level requirement (either completely above the seasonal highest water level or completely below the lowest seasonal level) cannot be satisfied, and the local soil does not have very low permeability, using clay to enclose the pit completely with sufficient thickness on all sides.

Step 6: After the facility is completely closed, grass or trees with shallow roots can be allowed to grow back, and the land can then be used as pasture for grazing animals, cropland, park and recreation, golf course, photovoltaic solar farm, or combination of the above.

In some embodiments, the method further includes: building an off-site large-scale burial facility for storage underground, including:

Burying the wood completely underground without sealing below the lowest level of fluctuating water table where water table is near surface.

Lining upslope direction with clay or synthetic liner to minimize water flow in the burial chambers where there is strong one directional flow.

Optionally, build a burial mound on top of the wood pit for burying and storing human remains, operated as a green burial graveyard.

In some embodiments, the method further includes: a method for determining the optimized size and number and return harvesting frequency of in-situ storage facilities, the step for determining the optimized size, number and return harvesting frequency of in-situ storage facilities includes:

Step 1: calculating sustainable wood availability of the managed forest.

Step 2: defining an area for harvest using an optimized forwarding distance, typically less than a mile.

Step 3: calculating the amount of wood sustainably available on this area for selective cutting or deadwood collection for a returning interval of 5-10 years. In case of plantation clear cutting, the return interval will be longer, about 20-30 years based on the optimal growth rate of the planted species.

Step 4: determining the size of the in-situ facility according to the amount of wood.

Step 5: calculating total number of such operations and facilities for a given region. This information can then be used to plan long-term operation and resource requirement.

The method of claim 1, further comprising: a method for determining the optimized size and number of the large-scale storage facilities. Wherein, the optimal size of the wood burial facility needs to strike a balance between size of wood source region and the cost of facility construction and transportation, depending on the local circumstances.

The step for determining the optimized size and number of the large-scale facilities includes:

Step 1: finding the wood availability per unit area typical for a region, e.g., US East Coast at 4 ton per hectare.

Step 2: finding the wood availability per unit area typical for a region for each kind of source: forest residue, urban waste wood, etc.

Step 3: adding them up, subtract other uses, to obtain a reasonable estimate of availability.

Step 4: estimating average distance for transportation, then defining a region for wood sourcing use cost of transportation, for example at $5 per 25 miles. This information will be used to determined how many such facilities can be built in an area such as a state.

Step 5: calculating the annual wood availability, then the total wood collectable by a facility.

Step 6: determining the size of a facility according to information obtained from aforementioned steps: the size of a facility should be 2-3 times larger than volume of wood collected over expected operation lifetime, at 20-30 years, after which the facility if filled to capacity and will be closed to allow subsequent use (park, solar farm etc.).

In some embodiments, the method further includes: another wood storage method: burying wood under water. wherein, the step for burying wood under water includes:

Step 1: determining and selecting stagnant and anaerobic water bodies for wood burial, or diverting flowing water before wood burial.

Step 2: collecting logs from surrounding regions, rafting or transporting wood through other means to the water body and sinking it to the bottom of the water body. For logs that are lighter than water, weights such as rocks may be tied to the logs and help them sink to the bottom. Wood logs can be grouped into large bundles and wrapped in synthetic liners and sink to the bottom with weight, where water bodies with less ideal condition for wood preservation, including most ocean bottoms.

In some embodiments, the method further includes: another wood storage method: dry storage. wherein, wood is locally sourced or transported to dry regions and stored underground or in small or large scale above-ground storage facilities.

In some embodiments, the method further includes: another wood storage method: cold storage. The step for storing wood in cold environment includes:

Step 1: Sourcing wood from different regions.

Step 2: Collecting, bundling, and transporting wood to ports, transportation can be done by rafting down river networks or by trucks or trains.

Step 3: Loading wood bundles onto container ships/barges at the ports, then shipping the wood bundles to Antarctica.

Step 4: Once at Antarctica, unloading the wood bundles and piling them up from the ground. The location of wood storage should be solid ground, not part of the icesheet or iceshelf to avoid damage and moving due to ground movement.

In some embodiments, the method further includes: a method for wood storage project evaluation, monitoring, verification and certification, wherein, a wood storage project is assessed and evaluated in the following categories of factors:

the trench/mound burial condition will be evaluated based on several factors, including the depth of the topsoil, the permeability of the soil, the infertility of the soil, the dimension of the trench, biomass and carbon content of buried wood and regrowth and maintenance condition on the surface (grass, crop, park, bare, etc.).

The surrounding burial site condition for preservation will be evaluated for the following factors including site climatological temperature: annual mean and seasonal range and site climatological humidity condition: soil moisture dry or wet, water-logged or not, water table, for both annual mean and seasonal cycle. For sample sites, sensors will be installed to directly observe underground oxygen ($O_2$) level, temperature, moisture, as well as potential $CO_2/CH_4$ leakage rate. The site-specific data can be used to calibrate carbon accounting model parameters.

The burial site environmental impact factors including disturbance to the site (ecological functioning; stability of soil; impact on hydrology such as loss of riparian buffer) and reduced or enhanced value for other use. 'Eye sore' if close to community, in which case mitigation strategy will be developed. A positive example is to build a park on top. Yet another positive example is the reclamation of abandoned mines that are used for wood burial.

The mass and carbon amount of wood stored will be calculated, sensors (such as ground penetrating radar, drone-based 3-dimensional topographical survey) can be used to evaluate the mass and carbon amount of wood stored, in addition to weighing and measurement at initial burial.

wherein, through the assessment of the above factors, both quantitative measures and qualitative criteria will be produced as follows:

the amount of carbon sequestered.

an estimated longevity range of buried carbon in years. This will be expressed as 5% decay time and/or half-life time, synthesized using a process-based wood decomposition model that takes into account of the biology of wood decomposition and the preservation condition above as model parameters. The model, after been applied to past data under a variety of conditions as well as future anticipated project data, is expected to continue to improve and provide estimates with greater and greater confidence.

an environmental soundness indicator will be given: excellent, good, fair, poor.

representative sites will be revisited at a regular frequency, typically once a year. The site will be checked for its maintenance and environmental impact. Measurement of underground condition will be collected, as well as direct sampling of buried wood and lab testing for its condition. Adjustment of model parameters and longevity estimates will be updated accordingly.

main categories of evaluation outcome;

wherein, at the conclusion of project/facility evaluation, major categories will be reported as:

Carbon stored: Large (>100,000 tCO2); Medium-large (10,000-100,000 tCO2); Medium (1000-10,000 tCO2); Small (<1000 tCO2).

Distributed or centralized storage.

Permanence: ultra-permanent (>10,000 years), permanent (>1000 years); semi-permanent (>100 years); short-term (decades).

Cost: High (>$100/tCO2); Medium ($50-100); Low (<$50).

Environmental and societal impact (source, operation, storage): beneficial; small negative that can be mitigated; modest impact; severe impact.

In another aspect, a network-based system for wood sourcing monitoring for sustainably managed wood sources is provided, including:

(a) a central processer accessible on a computer network.

(b) at least one sensor in communication with the central processor, wherein each of the at least one sensor is operably associated with one of the at least one wood source assets, the sensor being configured to transmit wood source information relating to the at least one wood source asset to the central processor.

(c) a client processor in communication with the central processor, the client processor configured to allow for inputting of wood source information, wherein the wood source information comprise at least one of an ownership information, current usage of the forest.

(d) a GIS integrated wood source inventory database in communication with the central processor, the wood source inventory database configured to store:

(i) Satellite and aerial observations of tree coverage, height and biomass.

(ii) Ground observation with modern optical methods such as AI-assisted analysis of optical and infrared image.

(iii) Information inputted from the client processor.

(e) software developed together with individually based forest models to generate a report designed to estimate biomass of at least a portion of a forest and provide information for determining the sources of wood for a wood storage project.

(f) cell phone apps developed for initial quick estimate of forest status.

In another aspect, a network-based system for wood sourcing for opportunistic wood sources, in which the source will be traced and documented to ensure the authenticity of its origin and any co-benefits claimed are real, includes:

(a) A central processer accessible on a computer network.

(b) a client processor in communication with the central processor, the client processor configured to allow for inputting of wood source information, wherein the wood source information comprise at least at least one of a source location, age and time of harvest, type of source, condition of wood, quantity of wood, ownership transaction history.

(c) A GIS integrated wood source inventory database in communication with the central processor, the wood source inventory database configured to store:

(i) source region and location (ii) age and time of harvest (iii) type of source (forest residue, yard waste, demolition debris, etc.)

(iv) condition of wood (v) quantity of wood (vi) ownership transaction history.

(d) Software associated with the central processor configured to generate a report that can be used for determining the source of wood for a wood storage project.

In another aspect, a system for storage project evaluation and monitoring is provided, including:

(a) a central processor accessible on a computer network.

(b) at least one sensor in communication with the central processor, wherein each of the at least one sensor is operably associated with one of the at least one wood storage assets, the sensor being configured to transmit wood storage information relating to the at least one wood storage asset to the central processor.

(c) a client processor in communication with the central processor, the client processor configured to allow for inputting and downloading information from the server (d) a wood storage inventory database in communication with the central processor, the inventory database configured to store:

(i) the factors for evaluation of trench/mound burial condition including the depth of the topsoil, the permeability of the soil, the infertility of the soil, the dimension of the trench, biomass and carbon content of buried wood, regrowth and maintenance condition on the surface (grass, crop, park, bare, etc.)

(ii) the factors for evaluation of surrounding burial site condition, including site climatological temperature: annual mean and seasonal range, site climatological humidity condition: soil moisture dry or wet, water-logged or not, water table, for both annual mean and seasonal cycle (f) collected data for underground oxygen level, temperature, moisture, as well as potential CO2/CH4 leakage rate.

(g) the burial site environmental impact factors including Disturbance to the site: ecological functioning; stability of soil; impact on hydrology such as loss of riparian buffer; Reduced or enhanced value for other use.

(e) software associated with the central processor; the software configured to generate a project report including the following information:

(i) the amount of carbon sequestered: Large (>100,000 tCO2); Medium-large (10,000-100,000 tCO2); Medium (1000-10,000 tCO2); Small (<1000 tCO2)

(ii) distributed or centralized storage (iii) permanence: ultra permanent (>10,000 years), permanent (>1000 years); semi-permanent (>100 years); short-term (decades).

(vi) cost: High (>$100/tCO2); Medium ($50-100); Low (<$50)

(v) environmental and societal impact (source, operation, storage): beneficial; small negative that can be mitigated; modest impact; severe impact.

(vi) an environmental soundness indicator will be given to a project: excellent, good, fair, poor.

(f) certificate will be issued for projects that are considered viable. Of certified projects, the amount of carbon sequestered, longevity of the sequestered carbon, environmental impact, co-benefits will be described, and categorical score will be given. An overall score/rating will be given.

In another aspect, a network-based wood and carbon storage monitoring, accounting and transaction system is provided, including:

(a) A central processor accessible on a computer network.

(b) At least one sensor in communication with the central processor, wherein each of the at least one sensor is operably associated with one of the at least one wood storage assets, the sensor being configured to transmit wood storage information relating to the at least one wood storage asset to the central processor.

(c) A wood storage inventory database in communication with the central processor, the wood storage inventory database configured to store: wood storage asset information relating to a plurality of assets at a plurality of locations, wherein the asset information comprises at least one of location, time, owner, mass of wood storage, type of wood, storage method etc.

(d) Carbon accounting software associated with the central processor, the carbon accounting software configured to calculate and track a calculated amount of carbon stored relating to at least at one of the wood storage assets based on information stored in the wood storage inventory database.

(e) A carbon storage database in communication with the central processor, the carbon storage database configured to store the amount of carbon stored in at least one of the wood storage assets at a given time.

(t) $CO_2$ equivalents conversion software associated with the central processor; the $CO_2$ equivalents conversion software configured to calculate a $CO_2$ equivalent amount based on the amount of carbon stored relating to at least one of the wood storage assets.

(g) A client processor in communication with the central processor, the client processor configured to allow for inputting any portion of the wood storage asset information and the carbon credit information of an enterprise or an individual, wherein the carbon credit information comprises at least one of a calculated carbon credit debt and a calculated carbon credit surplus relating to the at least one enterprise or individual who owns at least one of the wood storage assets.

(h) Carbon credit tracking software associated with the central processor, the carbon tacking software configured to calculate and track the carbon credit information relating to at least one of the wood storage assets or relating to at least one of the enterprise or individual.

(i) Carbon credit transactional software associated with the central processor, the carbon credit transactional software configured to receive the current market value of a carbon credit via the computer network, purchase carbon credits based on the calculated carbon credit debt, sell carbon credits based on the calculate carbon credit surplus.

(j) A client processor in communication with the central processor, the client processor configured to allow accessing, querying, downloading, and requesting information relating to any of the asset information and the carbon credit information.

Other aspects and implementations may become apparent in view of the following drawings and detailed description.

DETAILED DESCRIPTION

Figure 1:
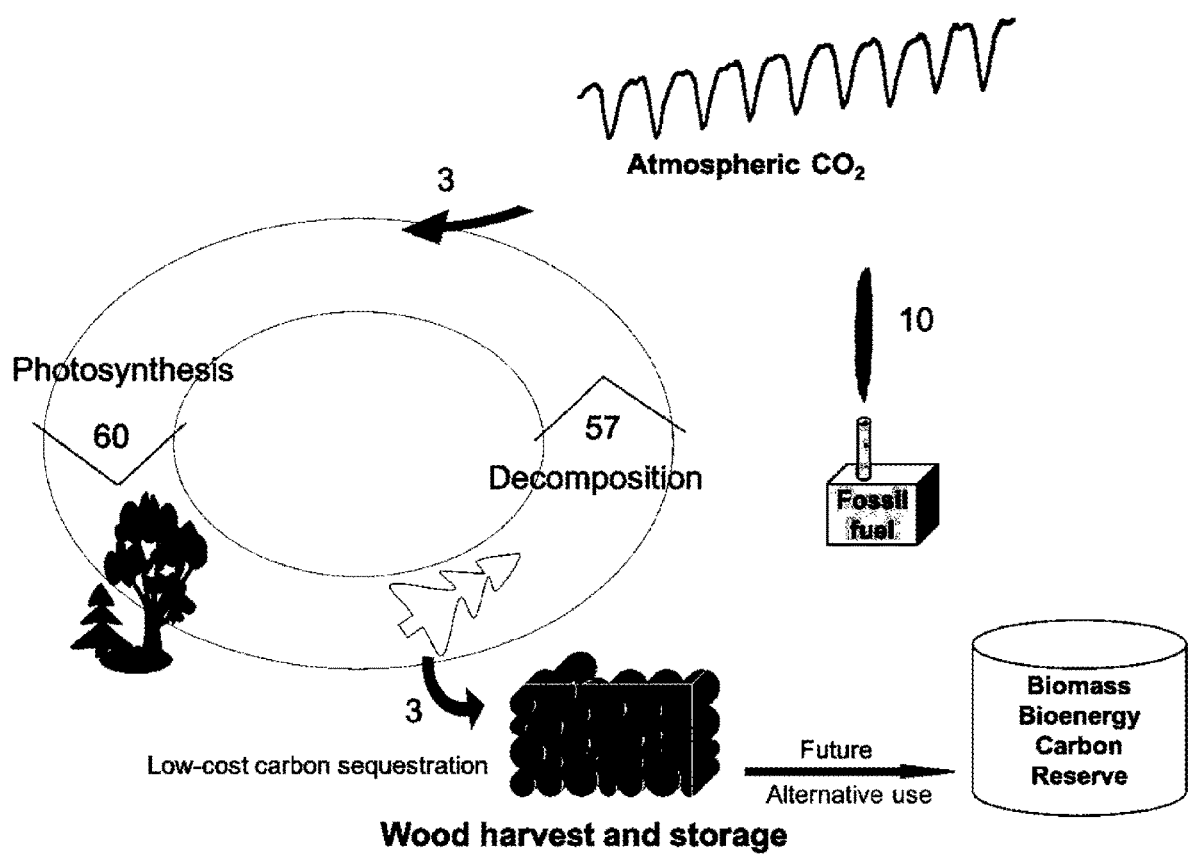
FIG. 1 illustrates wood harvest and storage (WHS) as a method for carbon sequestration. from a global carbon cycle perspective, trees act as a 'carbon pump'. Part of the assimilated carbon is 'siphoned off', by selectively harvesting or collecting wood, then stored permanently or semi-permanently. As forest continues to grow sustainably, the net effect is to remove $CO_2$ from the atmosphere. the numbers (in gtc/y), illustrating an ambitious scenario that could sequester ⅓ of current fossil fuel emissions. The well-preserved wood can be a future source of biomass raw material, bioenergy, or co2 should future needs change after the current climate crisis is over.

The present disclosure relates to methods and systems for wood harvest and storage, carbon sequestration and management. The methods and systems comprise determining source of wood used for storage and optimizing wood sourcing from opportunistic sources and sustainably managed timberland or forest, transporting, treating and storing sourced wood underground, semi-above ground or above ground at selected sites, calculating amount of carbon contained in stored wood, monitoring, evaluating, verifying and certifying carbon credit for wood storage project and conducting carbon credit trade.

The primary pathway to reduced greenhouse gas emissions is a transition to "low carbon economies," in which energy efficiency is improved and energy production has a much lower carbon footprint by transforming the energy infrastructure to include more renewable technologies and carbon capture and sequestration. Such a transition, however, is quite difficult to accomplish at the rate required to limit global temperature rise of 2° C.—the switch to low-carbon infrastructure is a slow process due to a variety of technological, socioeconomic, and political barriers. Thus, carbon sequestration, namely capturing carbon that is already in the atmosphere and locking it away, could play an important role in the cost-effective stabilization of atmospheric $CO_2$ at acceptable levels. Negative emissions will also be needed in light of the long lifetime of atmospheric $CO_2$ even after emissions are completely stopped. Indeed, nearly all future emissions scenarios that involve policy-intervention assume significant contribution from carbon sequestration.

The removal of $CO_2$ from the atmosphere can utilize physical, chemical or biological method (National Academies of Sciences Engineering and Medicine (NASEM), Negative Emissions Technologies and Reliable Sequestration: A Research Agenda. The National Academies Press, Washington, D.C., 2019). Biological carbon sequestration, hereafter bio-sequestration, relies on plant photosynthesis to capture $CO_2$ and assimilate the carbon into biomass. Examples of bio-sequestration include reforestation, no-till agriculture, and intensive forest management. Afforestation or reforestation is arguably the most widely embraced carbon sequestration technique because of its low cost, benign nature and many co-benefits. Unfortunately, its capacity is limited by the availability of land and the sink slows down as the forest matures. Because fossil fuel emissions from energy production continue to increase beyond the sequestration capacity of terrestrial ecosystems, mitigation through land-use management is usually viewed as a low-cost approach with relatively modest total mitigation potential.

The greatest potential for bio-sequestration may not come from one-time carbon storage in live biomass, but from using plants as a 'carbon scrubber' or 'carbon pump'. For example, despite the attractiveness of reforestation, the carbon sink diminishes as a forest matures. An alternative is to manage a forest in a way to separate 'carbon removal' via photosynthesis from 'carbon storage'. We can siphon off a fraction of the large biospheric productivity and store it away semi-permanently, thus creating a continuous stream of carbon sink. If our active management stores, say 3 GtC $y^{-1}$, or 5% of the terrestrial NPP, we can absorb more than ⅓ of current fossil fuel $CO_2$ emissions. Such reasoning lies behind recent estimates of large (theoretical) bio-sequestration or bioenergy potential through forestry and agriculture (N. Zeng et al., Carbon sequestration via wood harvest and storage: An assessment of its harvest potential. Climatic Change 118, 245-257, 2013).

A biological carbon sequestration strategy, hereafter termed Wood Harvesting and Storage (WHS) has been proposed in which forest is actively managed, and a fraction of the wood is selectively harvested via collection of dead wood or selective cutting of less productive trees, and the logs are buried or stored above-ground to prevent decomposition (FIG. 1). Compared to many traditional carbon management ideas in which the stored carbon saturates after a period of time, WHS creates a continuous stream of sequestered carbon. Carbon in stored wood would be relatively easy to monitor and verify, reducing risk of loss and other issues facing some other carbon sequestration strategies.

The estimated potential of WHS ranges from 2-10 Gt$CO_2$ $y^{-1}$ (1 tC is 3.67 t$CO_2$). In practice, this will come from a variety of sources such as waste wood and managed timber land. The methods of sourcing wood will determine the quantity of sequestered carbon. The preservation of wood for hundreds of years or longer for climate mitigation exceeds the usual timescales assumed of bio-sequestration such as reforestation or soil conservation. Active management to extend the lifetime of stored wood will be critical for the success. Carbon monitoring, full carbon accounting from source to storage will be essential for carbon credit.

Wood is a wonder material evolution created in vascular plants to support their 3-dimensional structure. The emergence of vascular plants 400 million years ago from ground-creeping photosynthesizers revolutionized the terrestrial biosphere, leaving the legacy of coal as their transformed remains.

Wood consists of mainly three key ingredients: cellulose, hemicellulose and lignin. Cellulose is a quasi-crystalline polymer formed by thousands to tens of thousands of glucose, which form long fibrous bundles connected and strengthened by shorter hemicellulose and amorphous lignin. Cellulose, hemicellulose and lignin are all carbohydrates and composed of C, H, and O in proportions similar to glucose, the simplest sugar $(C_6H_{12}O_6)_n$. While cellulose is long chains of glucose, hemicellulose are much shorter, often linking the long cellulose fibrils in cross-sectional direction of the cell wall. Lignin is a high molecular weight polymer of aromatic compounds, thus its high resistance to decomposition. Lignin is a main component of the soil humus. The typical C:N ratio is wood is 200:1, compared to 20:1 for leaves. Thus, when wood is buried, nutrient loss is relatively small. Importantly, in wholesome wood structure, lignin forms a scaffolding to protect cellulose and hemicellulose.

Wood can be degraded by physical, chemical and biological processes. When buried under ground, the physical disturbance will be nearly non-existent except under special circumstances such as earthquakes and landslides. Chemical degradation can occur especially in wet environment especially when it is highly acidic. However, of most concern is biological degradation. Biological agents that decompose wood are mainly fungi (brown, white and soft rots), insects (termites, beetles) and bacteria.

The main type of bacteria of concern is the cell-wall-degrading bacteria, which attack wood by erosion, tunneling, and cavitation. Little is known about the influence of different environmental factors on bacterial decay, but in general they seem more tolerant of cold temperature or low-oxygen conditions than even soft-rot fungi. They are often observed under water and are responsible for most of the microbial degradation of sunken ships, but are also know to occur in the terrestrial environment (Blanchette, R. A., T. Nilsson, G. Daniel, and A. Abad. 1990. Biological degradation of wood. In Archaeological wood: Properties, chemistry, and preservation, ed. R. M. Rowell and R. J. Barbour. Advances in Chemistry series 225. Washington, D.C.: American Chemical Society. 141-174). However, there is no evidence of bacterial degradation of wood under completely anaerobic condition.

Under anaerobic condition, three types of macro molecules, namely proteins, carbohydrates, and lipids provide the main substrates for decomposition of organic matter. The first step is hydrolysis, which creates amino acids, sugar, fatty acids, respectively. Subsequent steps are acidogenesis, acetogenesis and methanogenesis. A suite of bacteria, each of them requires specialized range of environmental conditions such as suitable temperature range are needed to degrade the organic matter.

In comparison to carbohydrate/protein/fat, the anaerobic bacteria are unable to digest lignin because its complex polymer structure. For example, in biodigesters, practically all waste organic material can be digested except for wood. Indeed, a major difficulty in cellulosic ethanol production using woody raw material is how to remove lignin Often, wood has to be pretreated by physical (heating) or chemical (acid) methods before fermentation. This is a major economic and energy cost for woody cellulosic ethanol. Even though resistance of wood to decomposition is an obstacle for bioenergy, here it is a key for preserving wood for carbon sequestration.

While creating anaerobic condition is one pathway to preserve wood for carbon sequestration, storing wood in dry or cold condition can also preserve wood semi-permanently because the fundamental biology that decomposers also need moisture and suitable temperature to thrive. The control of these 3 factors: oxygen, moisture, and temperature provides the basis for our methods in wood preservation on timescales long enough to contribute to removing atmosphere carbon dioxide for climate change mitigation.

1. Wood Sourcing Methods

Wood harvest and storage (WHS) projects can be classified based on where the woody material is sourced from. Two major categories are considered here, depending on whether the source is opportunistic (Type-A) or long-term and repeatable (Type-B).

1.1 Opportunistic Sources (Type A)

In the first type (TYPE A), woody material from opportunistic sources is collected, often with environmental co-benefits such as fire risk reduction and waste utilization. They are low-hanging fruits' limited by the availability of 'waste' wood. They are often one-time opportunities such as the utilization of urban waste wood. This method may have a potential of up to 2 Gt $CO_2$ per year globally. An opportunistic source of wood can be defined as "waste" wood (described in examples below) which value (carbon credit value+other co-benefits such as fire prevention+waste utilization, future usage-cost for transportation, treatment and storage) exceeds its value for other usages (such as making paper, lumber), when used for wood storage to obtain carbon credit.

Examples of this type are given below.

1) Forest Thinning (THIN)

Biomass from forest thinning for fire risk reduction and other purposes is used for sequestration. Fire suppression, such as in the US and Canada over last several decades, has left a large amount of dead vegetation. Combined with drought and insect infestation in the America West, this has led to more frequent and larger fires in recent years. The release of this carbon pool through catastrophic fires may become an important source to atmospheric $CO_2$ in the future. Collecting dead trees and burying them would reduce fire danger while creating a carbon sink.

2) Residue

Residues from forestry operations such as slash and woodchips. In many places, they are not utilized due to economic and other constraints. To the degree that nutrient depletion and other ecosystem functions are maintained, a portion can be buried for carbon sequestration. Furthermore, careful management enabled by the carbon value can support better ecosystem functioning 3) Urban Waste Biomass from urban tree removal, construction site tree removal, demolition and furniture wood. These are often a burden and may be costly to dispose. Collect and bury this biomass for carbon sequestration can completely reverse the cost equation.

4) Recovery

Recover trees from storm blowdown and other natural or unnatural disasters and store the carbon will prevent the release of this carbon into the atmosphere.

1.2 Sustainably Managed Sources (Type B)

In the second type (Type B), wood is harvested or collected directly from a growing forest, such as timberland and secondary-growth forest. The operation can be repeated every few years or decades and the carbon sequestered accumulates over time. Type B has large potential, up to 10 Gt $CO_2$ per year globally (about one third of global fossil fuel emissions).

1) Timber

Wood for carbon sequestration is harvested from a managed forest such as timberland. The forest is often privately owned, and has been used for timber, pulp for paper, biomass or bioenergy for many years. The sustainability and environmental impact of the forest are generally well established. Wood can be sustainably removed via thinning, rotation and other schemes. Carbon sequestration re-purposes or adds a new revenue to the original forest management objectives.

2) Nature-2

Wood is harvested from a secondary-growth forest, that is, a forest growing back from agricultural abandonment, degradation, fire or other disturbances. Such a forest goes through initial growth, followed by self-thinning, natural death, disease and other processes. Active management can lead to an overall more productive forest and better ecosystem service, while producing a carbon sequestration stream.

3) Restore

Manage forest land restored from degraded or marginal land for carbon. For example, tropical deforestation leaves land with poor quality after some years of grazing and agriculture.

Replanting new forest to take up carbon, followed by mixed use, including wood harvest and storage as an option can extend the initial carbon sink indefinitely.

Whether a wood source is viable for WHS depends on the full carbon accounting. For both types of wood sourcing, net carbon gain can be calculated using total carbon gain, that is, stored carbon less lost carbon due operation, relative to a baseline. For type A projects, the baseline is simply that the wood would decay if business-as-usual. For type B, the baseline is a live forest that follows a natural or managed state. The net carbon gain, which is a function of time, determines the feasibility, value and timing of operation of the project. These are illustrated in FIG. 4 and FIGS.

Figure 4:
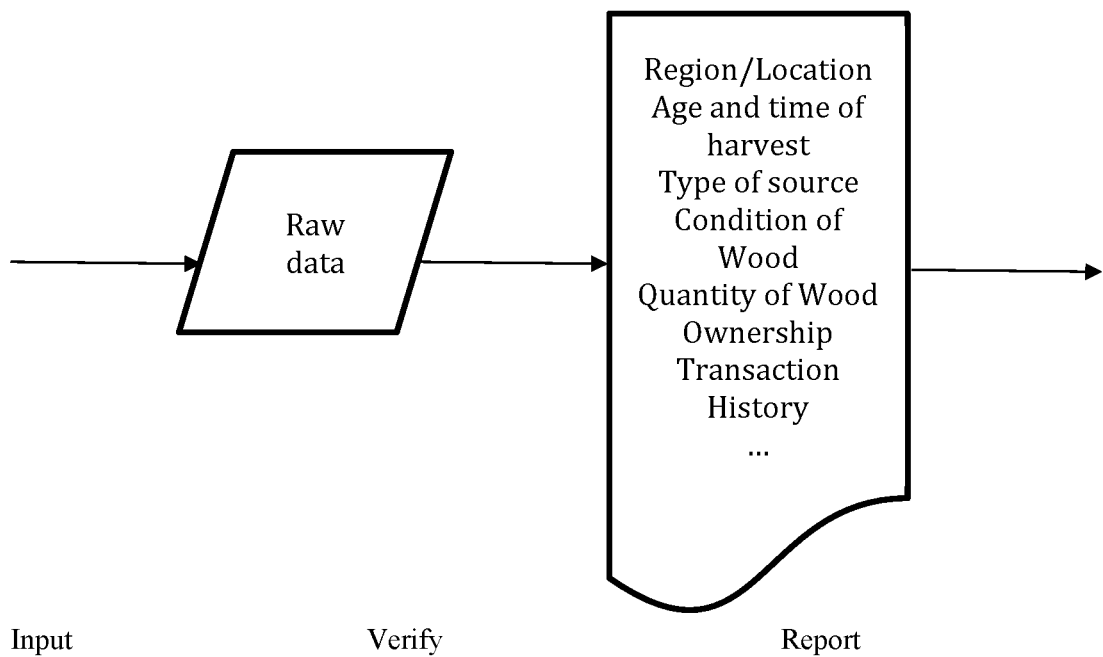
FIG. 4 is a diagram illustrating a method for type-A opportunistic wood sourcing.
Figure 5:
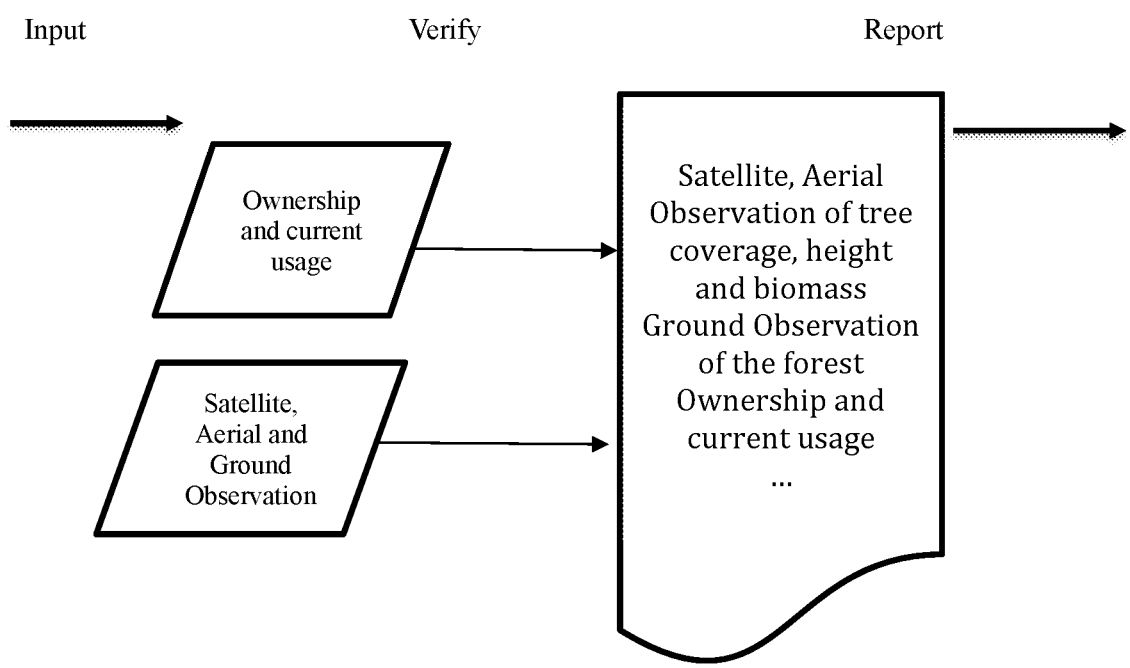
FIG. 5 is a diagram illustrating a method for type-B wood sourcing from managed forest.

In an embodiment, as shown in FIG. 4 and FIG. 5, a method for wood sourcing is provided, the method for determining source of wood used for storage and optimizing wood sourcing comprises:

1) For type A opportunistic wood source, as shown in FIG. 4, the source will be traced and documented to ensure the authenticity of its origin and any co-benefits claimed are real.

2) For type B project, intelligent systems for sensing, monitoring, and methods for analysis can be used effectively for achieving the objectives, including the Internet of Things, Wireless Sensor Networks, Internet of Trees, Deep Learning, etc. As shown in FIG. 5, managed forest will be monitored with multiple methods, including:

Satellite observations of tree coverage, height and biomass, validated by ground observations; other targeted aerial observations from airplane or drone can also be applied; ground observation with modern optical methods such as AI-assisted analysis of optical and infrared images.

Software can be developed together with individually based forest models to estimate biomass and forest health in general.

Cell phone apps can be developed for initial quick estimate of forest status.

Figure 24:
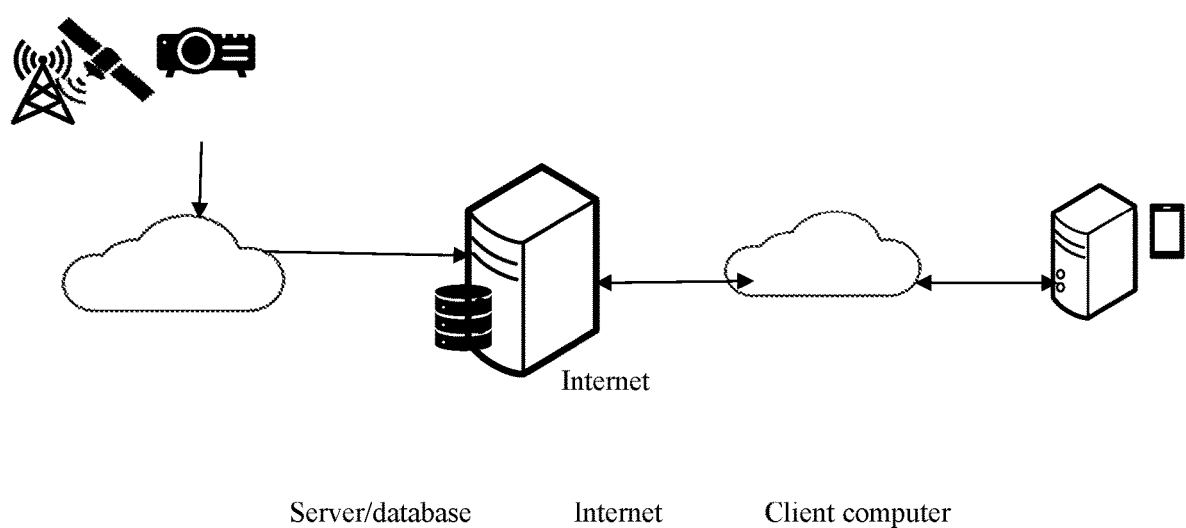
FIG. 24 is a diagram illustrating a network-based system for wood sourcing monitoring for sustainably managed wood sources according to an embodiment of the present disclosure.

As shown in FIG. 24, a network-based system for wood sourcing monitoring for sustainably managed wood sources can be developed, includes:

1) a central processer accessible on a computer network.

2) at least one sensor in communication with the central processor, wherein each of the at least one sensors is operably associated with one of the at least one wood source assets, the sensor being configured to transmit wood source information relating to the at least one wood source asset to the central processor.

3) a client processor in communication with the central processor, the client processor configured to allow for inputting of wood source information, wherein the wood source information comprise at least at least one of a ownership information, current usage of the forest.

4) a GIS integrated wood source inventory database in communication with the central processor, the wood source inventory database configured to store:

a) satellite and ariel observations of tree coverage, height and biomass.

b) ground observation with modern optical methods such as AI-assisted analysis of optical and infrared images.

c) information inputted from the client processor.

5) software developed together with individually based forest models to generate a report designed to estimate biomass of at least a portion of a forest and provide information for determining the sources of wood for a wood storage project.

6) cell phone apps developed for initial quick estimate of forest status.

Figure 25:
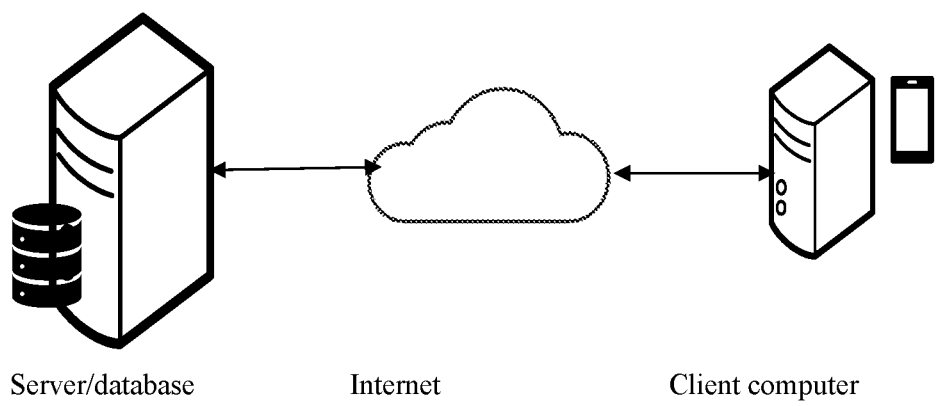
FIG. 25 is a diagram illustrating a network-based system for wood sourcing for opportunistic wood sources according to an embodiment of the present disclosure.

As shown in FIG. 25, a network-based system for wood sourcing for opportunistic wood sources can be developed, in which the source will be traced and documented to ensure the authenticity of its origin and any co-benefits claimed are real, includes:

1) a central processer accessible on a computer network.

2) a client processor in communication with the central processor, the client processor configured to allow for inputting of wood source information, wherein the wood source information comprise at least at least one of a source location, age and time of harvest, type of source, condition of wood, quantity of wood, ownership transaction history.

3) a GIS integrated wood source inventory database in communication with the central processor, the wood source inventory database configured to store:

a) source region and location.

b) age and time of harvest.

c) type of source (forest residue, yard waste, demolition debris, etc.).

d) condition of wood.

e) quantity of wood.

f) ownership transaction history.

4) software associated with the central processor configured to generate a report that can be used for determining the source of wood for a wood storage project.

Carbon accounting will be based on calculating carbon gain of the WHS project compared to a baseline. Wood harvest and storage (WHS) projects can be classified based on where the woody material is sourced from.

1.3 Carbon Accounting for Type A Project (Waste Wood as Source)

Figure 6:
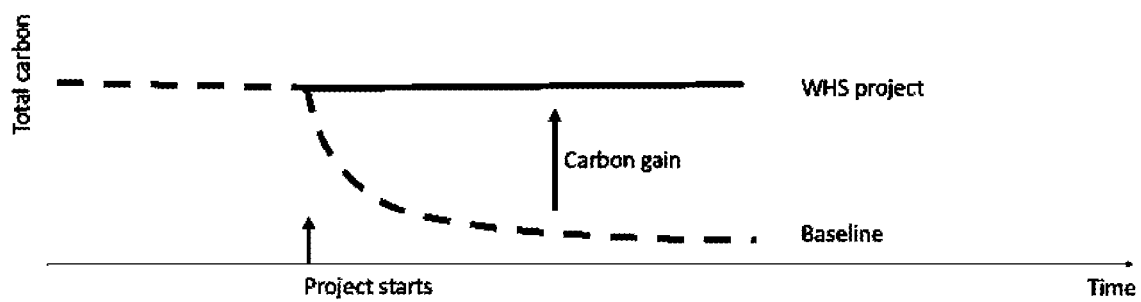
FIG. 6 is a diagram illustrating a type-A project. Wood is sourced from opportunistic sources such as urban waste wood disposal. The carbon gain for carbon credit is 'avoided' carbon emissions relative to a baseline.

In the first type (TYPE A), wood is sourced from opportunistic sources such as urban waste wood disposal. As shown in FIG. 6, the carbon gain for carbon credit is 'avoided' carbon emissions relative to a baseline.

Woody material from opportunity sources is collected, often with environmental co-benefits such as fire risk reduction and waste utilization. They are 'low-hanging fruits', limited by the availability of 'waste' wood. They are often one-time opportunities such as the utilization of urban waste wood. This method may have a potential of up to 2 Gt $CO_2$ per year globally (Zeng et al., 2012).

First, a baseline is established. The baseline includes an assessment of the lifetime of the source wood. While decomposition (or none) of stored wood is continuous, we can choose two timescales: half-life time and 5% decay time (95% stored), but other timescales can be chosen as well. For example, whole tree logs on the forest floor have a half-life time ranging from few years in tropical rainforest to many decades or longer in boreal forest, depending on local climate and environmental factors. Similarly, waste wood such as furniture have similar timescale in open dumps.

Lifetime of buried wood is then assessed based on the storage method and environmental conditions. The lifetime can be broadly classified into a few categories: 1) stop-gap (<20 years), 2) short-term (20-100 years or a few decades), 3) long-term or semi-permanent (100-1000 years), and 4) permanent (>1000 years).

A model can then be developed as a single parameter model such as exponential decay.

$$C = C_0 \exp\left(-\frac{t}{\tau}\right)$$

where C is the carbon pool size with initial value $C_0$, t is time and T is the e-folding decay time scale. Depending on material and environment, some may be better modeled using multi-parameter model with more realistic/sophisticated formulation, for example, a distributed model:

$$\frac{dC}{dt} = J(t) - \int_0^\tau J(t-\tau)\Gamma(\tau)d\tau$$

where $\Gamma(T)$ is a gamma function and J is a continuous input added wood to the carbon pool. The parameter values will be based on the life-time estimates. The model can then simulate continuously evolving carbon gain at any desired time interval. This carbon gain will then serve as the basis for carbon accounting and carbon credit. In the semi-permanent storage methods described here, the lifetime of stored wood is much longer than baseline, the carbon gain approaches the amount of stored carbon on climate-relevant 100-year timescale because wood typically decays in few decades or less in the baseline.

1.4 Carbon Accounting for Type B Projects (Continuous Sources from Managed Forest)

Figure 7:
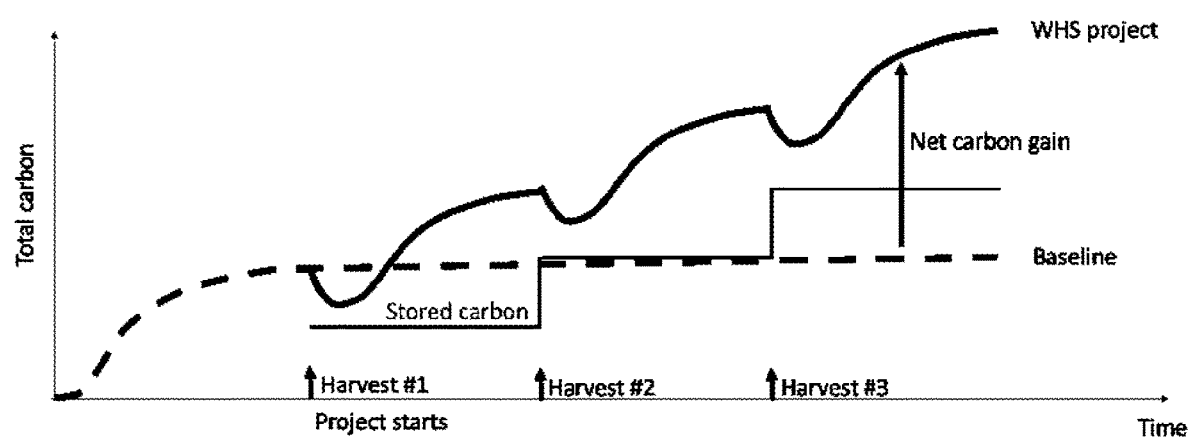
FIG. 7 is a diagram illustrating a type-B project. Wood is sourced from sustainably managed growing forest. Repeated harves-storage cycles lead to long-term accumulation of carbon gain.

In the second type (Type B) projects, as shown in FIG. 7, wood is harvested or collected directly from a growing forest, such as timberland and secondary-growth forest. The operation can be repeated every few years or decades and the carbon sequestered accumulates over time. Type B has large potential, up to 10 Gt $CO_2$ per year globally, about one third of global fossil fuel emissions (Zeng et al., 2012).

This type of project involves more complex accounting upstream because the sustainability of the wood sources is a critical aspect.

Immediately after harvest, the forest may be a small carbon source because some material may be left on the forest floor for nutrient recycling, and the carbon will be released back to the atmosphere in relatively short amount of time. There may be additional loss in handling. It is only after a while when new trees grow, the recovered carbon pool plus the stored carbon will exceed the carbon of the original pool. This carbon gain is the net carbon sequestered. If selective cutting or collection of downed wood is the main operation, the initial loss would be small or negligible. The full carbon credit of the stored carbon should not be given immediately, but rather be given over time, in line with the regrowth uptake. Investors can choose upfront investment with discounted value. The time-dependent carbon accounting proposed here will be critical for the long-term success of the strategy.

Life cycle analysis (LCA) will be conducted, with the aid of carbon cycle model for the full accounting of each kind of operation. Parameters and input of the analysis will be based on carbon cycle models that simulate forest growth for the specific species, calibrated with biomass growth data. The net carbon gain, that is, the stored carbon plus regrowing forest, subtract the baseline forest will be used as the basis for carbon credit.

Figure 8:
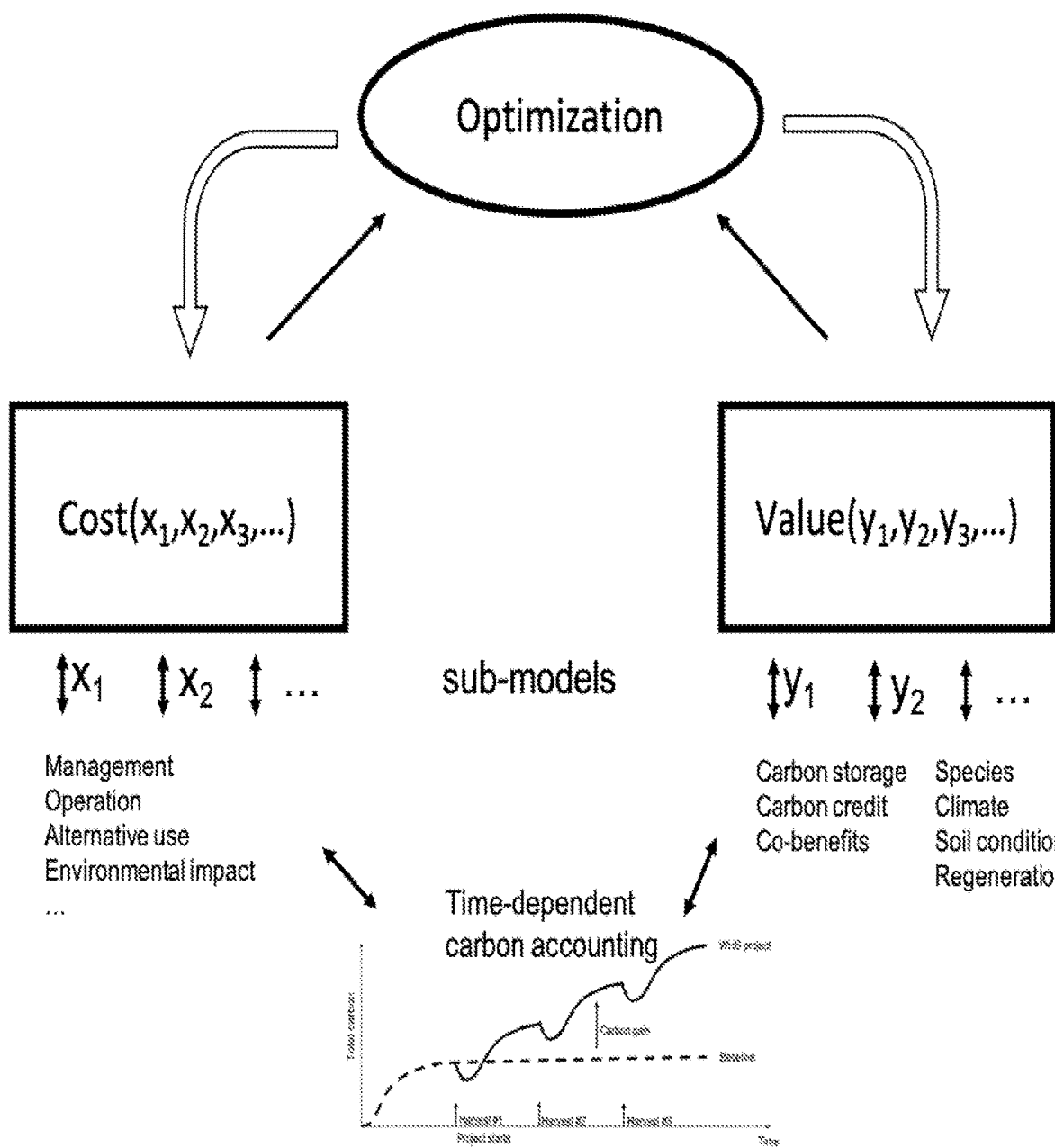
FIG. 8 is a schematic diagram of cost optimization with processes and sub-models.

Forest is a precious resource that provides a multitude of ecological functions as well as many human demands such as timber, furniture and paper making. In the context of climate change, biomass in live trees and active soil stores carbon. A key innovative aspect of wood harvest and storage is to use trees as carbon 'pump', not just carbon storage. Because of the limited land area, carbon sequestration competes with other wood use. Nevertheless, studies have shown large potential in sequestration. Optimization methods are used for decision making. FIG. 8 illustrates a method for cost optimization in wood sourcing disclosed by the present disclosure.

For example, for a forest landowner, the optimization will provide the best option for deciding whether to use the forest for timber, paper pulp, carbon sequestration or other usages. If for carbon sequestration, it provides a tool for deciding planting-harvesting frequency in order to optimize the carbon sequestered. As another example, for a storage facility manager or owner, the optimization will provide the best choice for deciding the size of the facility versus area for sourcing wood.

Mathematical models are thereby developed to optimize the wood sourcing and storage problem for carbon sequestration. The basic principle can be expressed as a method to minimize a cost function J:

$$J(x,y)=J(x_1,x_2,x_3,\ldots,y1,y2,y3,\ldots)$$

where $x=x_1, x_2, x_3, \ldots$ is a vector of multiple factors that impact the cost of sourcing wood, while $y=y_1, y_2, y_3, \ldots$ is vector defining the total value of the forest, including value of the sequestered carbon, or alternative use for lumber or paper, each with its own value proportional to the amount allocated to that particular use. For example, for a timberland owner who needs to determine whether or how much the source can be diverted for carbon sequestration, these factors include the land area, forest age, the carbon stored as a function of time in live biomass, carbon stored in storage, the lifetime of stored biomass, harvesting frequency, cost of harvest, cost to the environment due to different strategies, cost of transportation and storage. Another important factor is the cost of transportation to storage facility. For waste wood sources, the cost of disposal vs. cost of transportation. The optimization provides multiple perspectives for different stakeholders in the process, for example, owner of a forest, storage facility operator, owner of waste wood, government from environmental or job point of view.

One of the more complex factors is carbon storage in time relative to a baseline or other wood use methods.

$y_1=y_1$(species, climate factors, harvest frequency, regeneration strategy, fire prevention . . . ).

Figure 16:
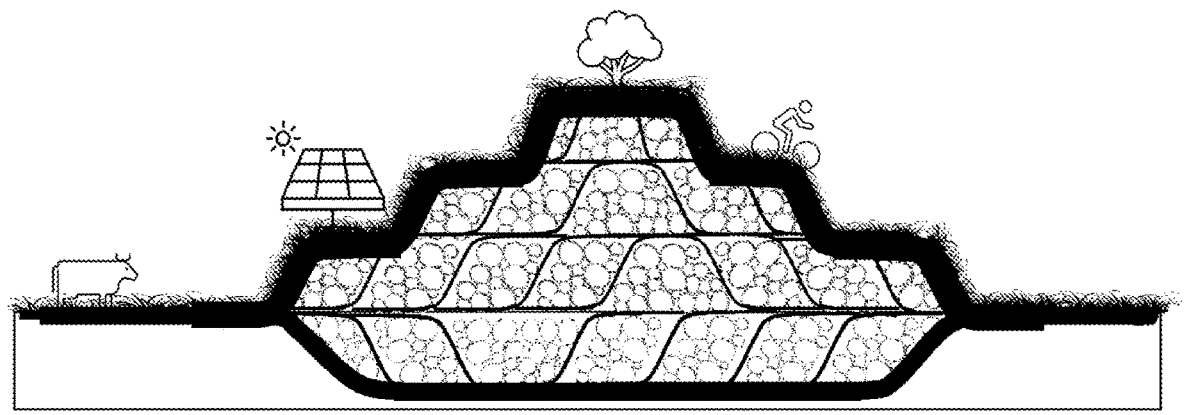
FIG. 16 is a diagram illustrating another method for wood storage according to an embodiment of the present disclosure, wherein, a large-scale wood burial facility with surface intrusion (hill) is provided. After closing of the top, grass and shallow rooted trees can be allowed to grow, then used as park, grazing land, cropland, solar farm, or a combination thereof.

This can be calculated using semi-empirical forest growth models, or more complex carbon cycle models. FIG. 16 illustrates the result from such a modeling method. In another approach, forestry gap models can be used to simulate multi-species multi-age forest stand, useful for selective cutting strategy and better forest management.

The optimization procedure then uses the input of different usages and parameter values to find the best overall value relative to cost, that is, to minimize cost J. In simplified versions, this can be solved by taking the derivative of the cost function zero.

$$\frac{\partial J}{\partial x}=0, \frac{\partial J}{\partial y}=0$$

Given the complexity of the underlying models and processes, the optimization problem is best solved numerically. Iterative methods can be used to allow different sub-models to converge.

Measurements of the growing forests or stored carbon can be merged with predictive model using data assimilation technique. This technique combines mechanistic model of forest growth with the data to obtain best estimates of carbon pool size as a function of time. Model parameter values such as photosynthesis rate dependence on soil moisture and temperature are perturbed based on their uncertainties. This generates an ensemble of possible model states (forecast) evolving in time.

The data assimilation inputs are the observations $y^o$, the ensemble forecast $x_k^b(t) = M(x_k^a(t-1))$
with mean $\bar{x}^b$, and the forecast of the observation $$y_k^b = h(x_k^b)$$

where M represents the full nonlinear model, k is the index for model ensemble member, h is an 'observation operator' that 'maps' model prediction onto observation space in order to compute the observation model error covariance $y^o - h(x_k^b)$. This is an ensemble square-root filter in which the observations are assimilated to update only the ensemble mean while the ensemble perturbations $x_k^b - \bar{x}^b$ are updated by transforming the forecast perturbations through a transform matrix:

$$\bar{x}^a = \bar{x}^b + X^b \tilde{P}^a (HX^b)^T R^{-1} [y^o - h(\bar{x}^b)]$$

$$X^a = X^b [(K-1)\tilde{P}^a]^{1/2}$$

Here K is the total number of ensemble members, $X^a$, $X^b$ are perturbation matrices whose columns are the analysis and forecast ensemble perturbations, respectively. $X^b$ is updated every analysis time step, therefore the forecast error covariance $$P^b = \frac{1}{K-1} X^b X^{bT}$$

is flow-dependent. $\tilde{P}^a$, the analysis error covariance in ensemble space, is given by $$\tilde{P}^a = [(K-1)I + (HX^b)^T R^{-1}(HX^b)]^{-1}$$

which has dimension K by K, much smaller than both the dimension of the model and the number of observations. Thus, the algorithm performs the matrix inverse in the space spanned by the forecast ensemble members, which greatly reduces the computational cost.

The final analysis product that describes the best estimates of carbon density as a function of time, taking into account of measurements and known carbon dynamics. It can then be used for the cost-value analysis above.

2. Wood Storage Method

Wood Storage methods include: 1) Burial under soil; 2) Above ground storage in shelter, warehouse, lining, thin soil, and other cover-in methods; 3) Submerge under water; 4) Dry condition; 5) Cold condition; 6) Combinations of above. The preservation of wood for hundreds of years or longer timescales relevant to climate change can be practical. A key factor is to maintain extremely low oxygen level, achievable through burial under low-permeability soil or submerged under anaerobic water body. A concern of possible methane genesis by anaerobic bacteria is relieved because wood, unlike carbohydrate, is resistant to such bacteria who do not attack lignin. Sub-zero temperature and very dry conditions may also be suitable as biological activities are very slow under such conditions. Storage above ground in such as shelters, warehouses, and simple covers are also feasible, but will require more maintenance. To be practical, a major constraint is the economy of operation and maintenance. Within the constraints of practicality and cost, semi-permanent or permanent conservation of wholesome wood is generally preferred for both climate benefits and possible future alternative use as biomass raw material or biofuel.

We developed the following formula to describe the factors influencing the rate of decomposition of stored wood, namely moisture, temperature, oxygen level, and surface area:

$$D = D_0 D_1(w) D_2(T) D_3(O) D_4(A)$$

where $D_0$ is the basic decomposition rate that is tree species dependent, while D1-D4 are relative or normalized. The decomposition rate D is function of moisture w, temperature T, oxygen level O, and total surface area of buried wood A. These functions can be highly nonlinear and they can interact. For instance, at low moisture, decomposition rate is slow, then increases at higher moisture, but at extremely high moisture, i.e., water-logged condition, the interaction with oxygen then leads to reduced decomposition. While different mathematical functions can be used to model these behaviors, they need to represent the general relationships. Here, a set of specific forms is proposed.

For moisture dependence, $$D_1(w) = \frac{d_0 + \exp\left(-\left(\frac{w_0 - w}{w_1}\right)^{n_1}\right)}{d_0 + 1}, \text{ if } w \leq w_0$$

$$= \frac{d_0 + \exp\left(-\left(\frac{w - w_0}{w_2}\right)^{n_2}\right)}{d_0 + 1}, \text{ if } w > w_0$$

For temperature dependence, $$D_2(T) = \exp\left(-\left(\frac{T_0 - T}{T_1}\right)^{n_1}\right), \text{ if } T \leq T_0$$

$$= \exp\left(-\left(\frac{T - T_0}{T_2}\right)^{n_2}\right), \text{ if } T > T_0$$

For both temperature and moisture dependence, the decomposition rate is small at low values, but reaches an optimal value of $w_0$ or $T_0$, and decreases at high values. This represents the general biological behavior that has an optimal condition at intermediate environmental conditions.

For dependence on oxygen level (O), we use a logistic function, $$D_3(O) = \frac{o^\alpha}{o_0^\alpha + o^\alpha}$$

where $O_0$ is ambient oxygen concentration at 21%, and a determines the sensitivity at extremely low oxygen values when decomposition rate is slow. The oxygen level itself depends on a range of conditions, in particular the hydrological state and how well the material is sealed.

Because the physical protection, the interior of a whole log is less accessible to decomposers. If the log is chopped into woodchips, the surface area would be much larger. Thus the 'wholesomeness' of the material is also an important factor. We formulate this as a dependence on exposed surface area A, $$D_4(A) = \left(\frac{A}{A_0}\right)^b$$

where, $A_0$ is the surface area of the original whole raw wood logs. Woodchips have a total surface area much larger than logs ($A \gg A_0$) for the same mass, thus is more likely to decompose. Decomposition rate here is mass loss rate, and $D_4$ is relative to that of whole log. The exponent b represents the impact of effective surface area, and it is less or equal to 1. The exact value depends on how compact the material is, densely packed woodchip in clay soil would have less exposed effective area, thus smaller exposed surface area.

There are other factors such as acidity (pH), alkalinity and salinity that are important for preserving materials such as bone and metals as in archaeology, but are considered of minor influence for clean wood preservation in natural environment, and are not considered here.

Figure 2:
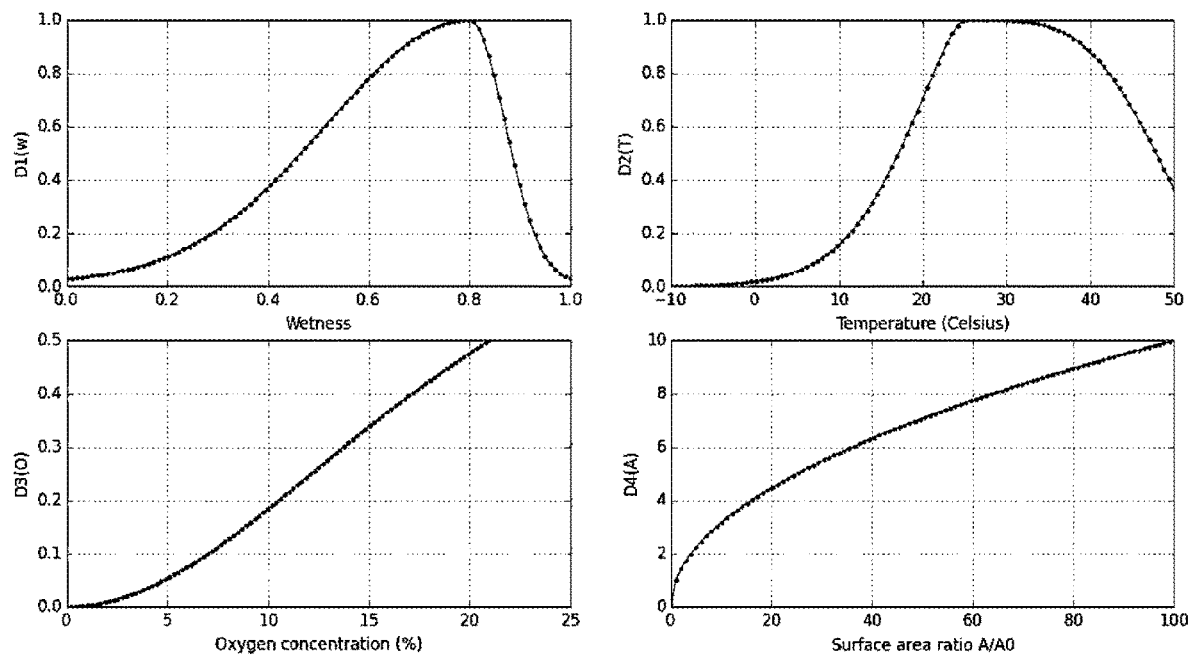
FIG. 2 is a diagram illustrating decomposition rate depends on environmental conditions and characteristics of stored wood: moisture, temperature, oxygen concentration, and surface area. Plots are for typical parameter values than depend on specific conditions such as wood species.

These functions are shown in FIG. 2 for representative parameter values.

Figure 3:
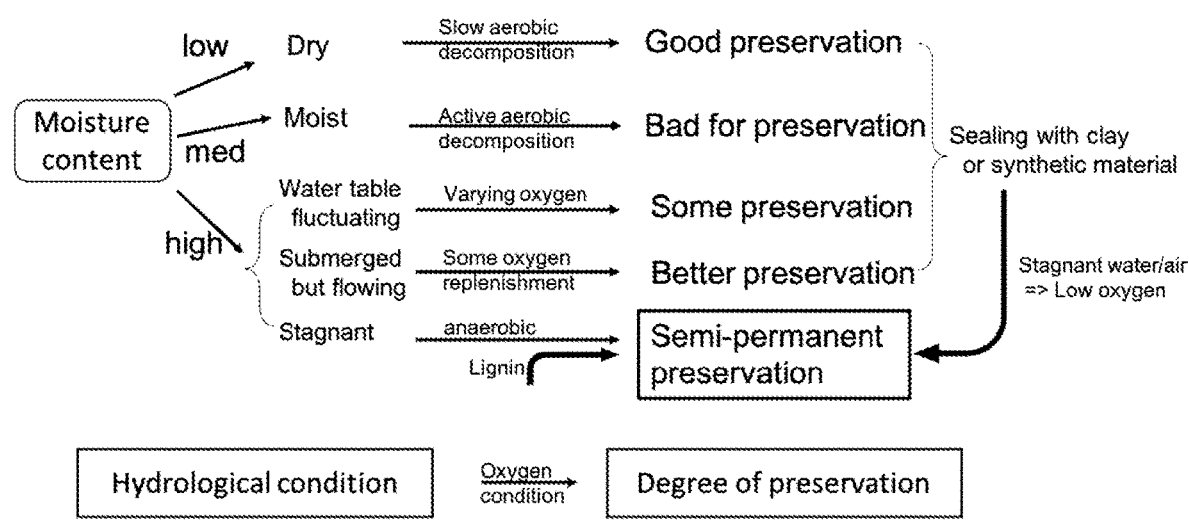
FIG. 3 is a diagram illustrating the importance of moisture and oxygen condition in influencing wood preservation. Both dry and wet conditions can be utilized for wood storage, but the specific circumstances can impact the longevity greatly. Keeping the water stagnant by sealing with clay or synthetic material can significantly extend the lifetime by reducing the chance for oxygen replenishment and maintaining extremely low oxygen level.

This formula can be used to determine the methods of wood storage for a variety of conditions, taking into account interaction of these factors. For example, in desert region, moisture is low, one can then choose a method that requires less protection such as no clay, and simple above ground storage. In the other extreme, when moisture is very high, the site becomes water-logged which is also favorable for preservation. In this case, the goal is to maintain the water-logged condition by preventing drying. A critically important consideration is how moisture condition influences oxygen level as illustrated in FIG. 3. Understanding of such interaction serve as the basis for the proposed storage method described below.

2.1 Burial Under Soil 2.1.1 Basic Methods

A key factor to ensure the longevity of stored wood is to reduce oxygen. If done well, the buried wood is considered permanently stored (>1000 years, and at least hundreds of years).

Soil texture: Low permeability, such as clay.

Hydrology: avoid water level fluctuation and water flow; place wood in either a) always under the water level, i.e., below the water level of the dry season, or b) always above the water level, i.e., above the water level at the wet season.

If neither of the above is satisfied, source clay soil from somewhere else to completely enclose the buried wood: bottom, top and all sides.

If none of the above is satisfied, have soil layer on top as thick as practically possible (one to several meters). The permanence of the buried wood will be reduced, but may still be accepted as semi-permanent (>100 years). High permeability soil such as sand and gravel should be avoided (<100 years, temporary storage).

A few typical situations are described below, with special attention to hydrology impacting oxygen level. Keeping the water stagnant by sealing with clay or synthetic material can significantly extend the lifetime by reducing the chance for oxygen replenishment and maintain extremely low oxygen level.

Figure 9:
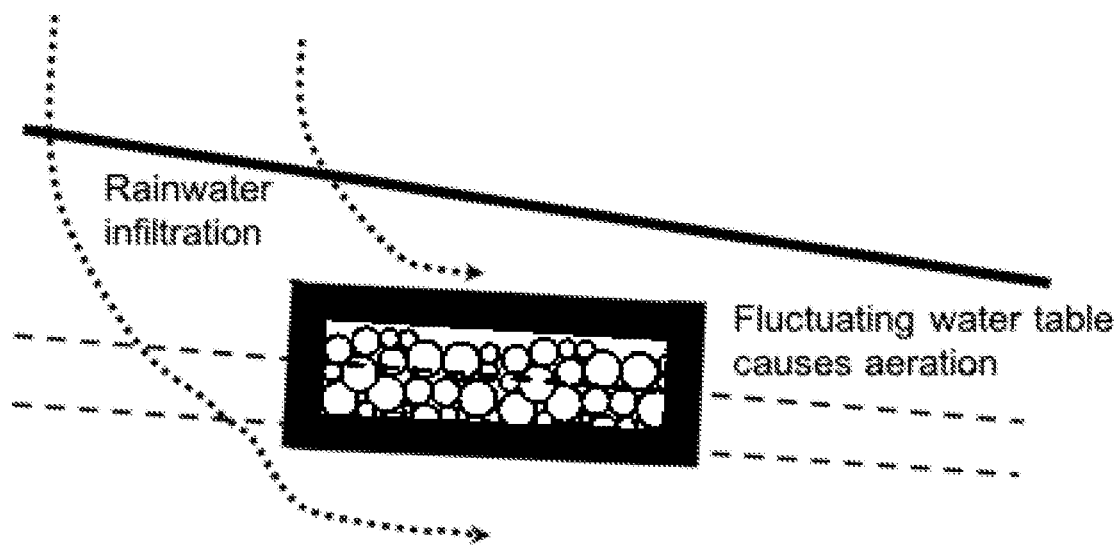
FIG. 9. is a diagram illustrating a method for wood storage according to an embodiment of the present disclosure, wherein, fully sealed wood, buried in 'worst-case' scenario, inside fluctuating water table. Dark layers indicate sealing.

1) Burial chamber fully sealed in clay that is 0.3 meter or thicker, synthetic liner, or other impermeable materials (FIG. 9). In the worst-case scenario, water table fluctuates through the wood pile which can cause aeration and oxygenation. The burial needs to be sealed from all sides with clay or other material.

Figure 10:
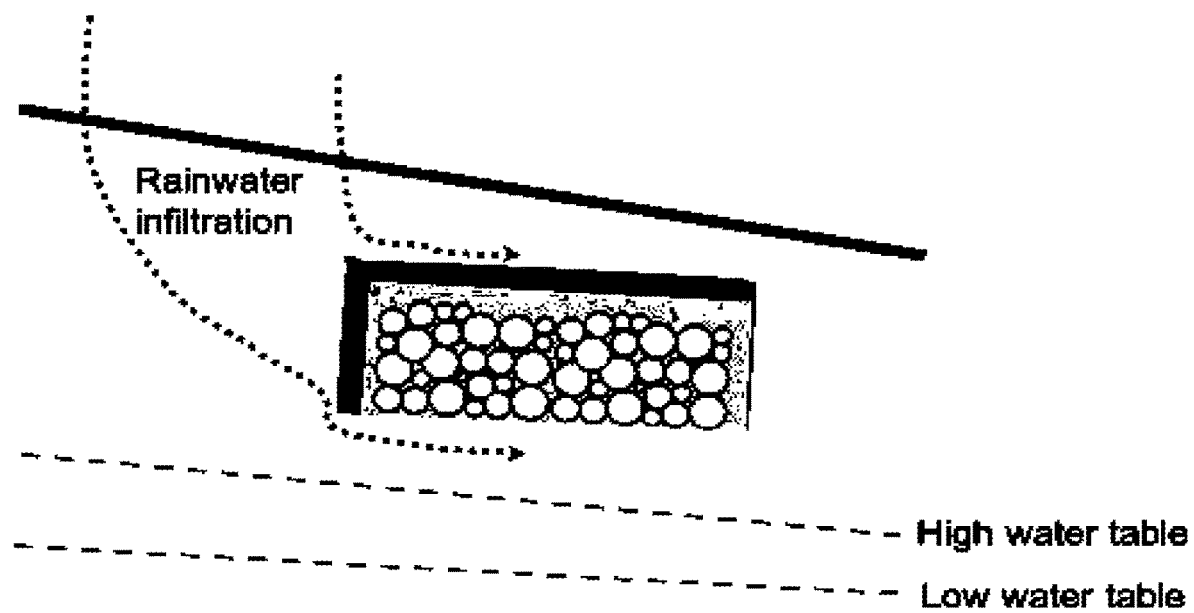
FIG. 10 is a diagram illustrating another method for wood storage according to an embodiment of the present disclosure, wherein, buried wood is above water table.

2) Burial underground, above the highest seasonal water table (FIG. 10). In such a place, water table is significantly below surface so there is enough depth above for wood storage. The main thing here is to avoid rainwater infiltration that brings in oxygen. Sealing the top and upslope side may be needed.

Figure 11:
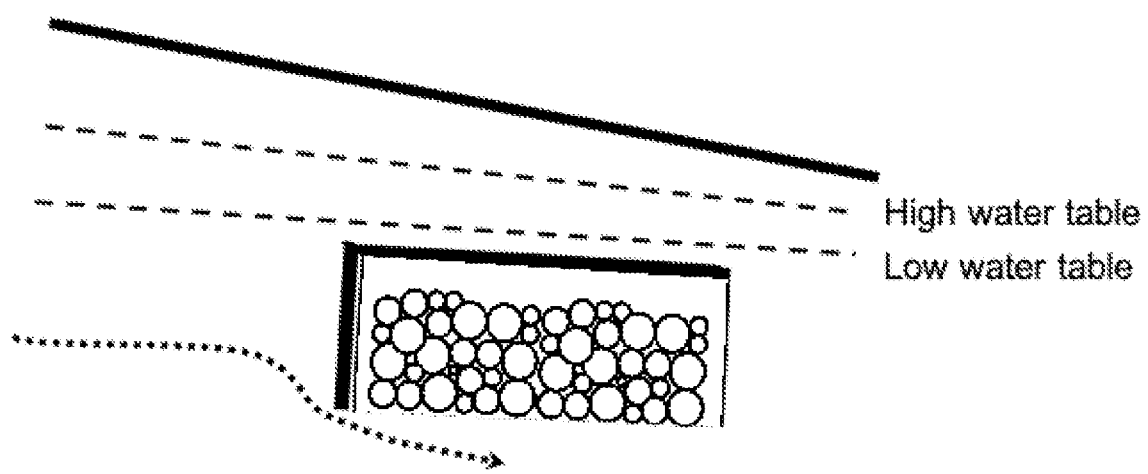
FIG. 11 is a diagram illustrating another method for wood storage according to an embodiment of the present disclosure, wherein, wood is buried below water table with lateral water flow.

3) Burial underground, below water table, but there is significant lateral flow due to topographical gradient or other causes as happens in mountainous, piedmont, or undulating hilly regions (FIG. 11). Sealing of upslope side is preferred to divert the flow around or below the burial pile.

Figure 12:
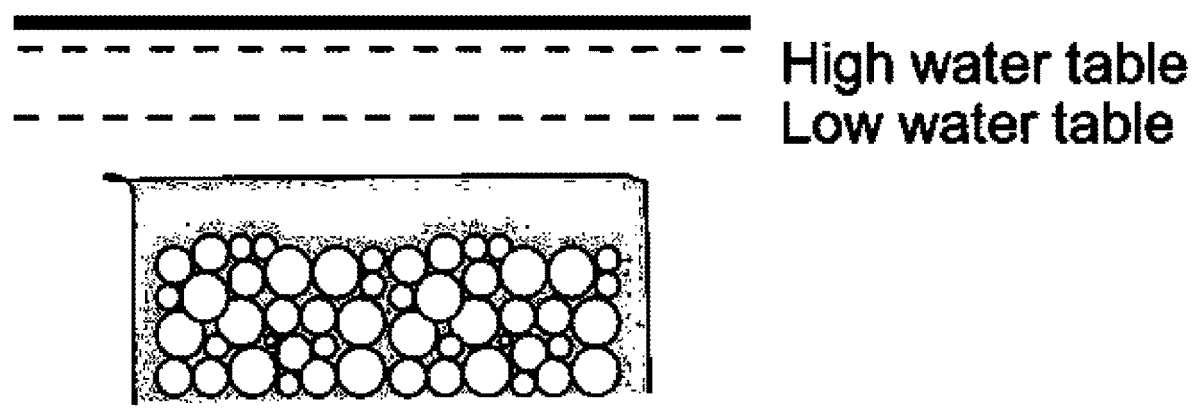
FIG. 12 is a diagram illustrating another method for wood storage according to an embodiment of the present disclosure, wherein, wood is buried under water table with no or little lateral flow (stagnant).

4) Burial under stagnant water (FIG. 12). Water table is close to surface, and the water is stagnant due to flat topography. This happens usually at low land area. Sealing may not be needed for permanent storage, though it is still safer if low-cost clay or silt is available for sealing.

2.2.1 In-Situ Burial Methods

Figure 13:
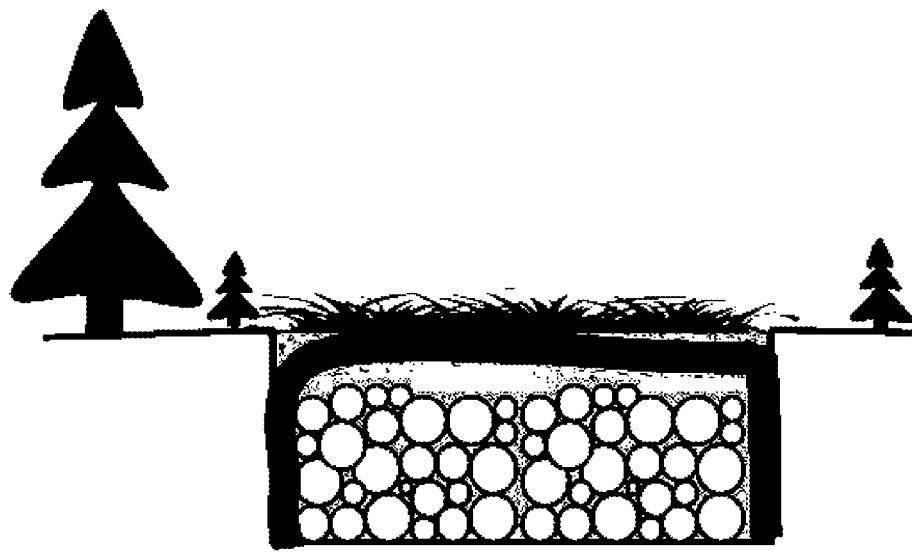
FIG. 13 is a diagram illustrating another method for wood storage according to an embodiment of the present disclosure, wherein, wood is stored in-situ and buried underground in trench.
Figure 14:
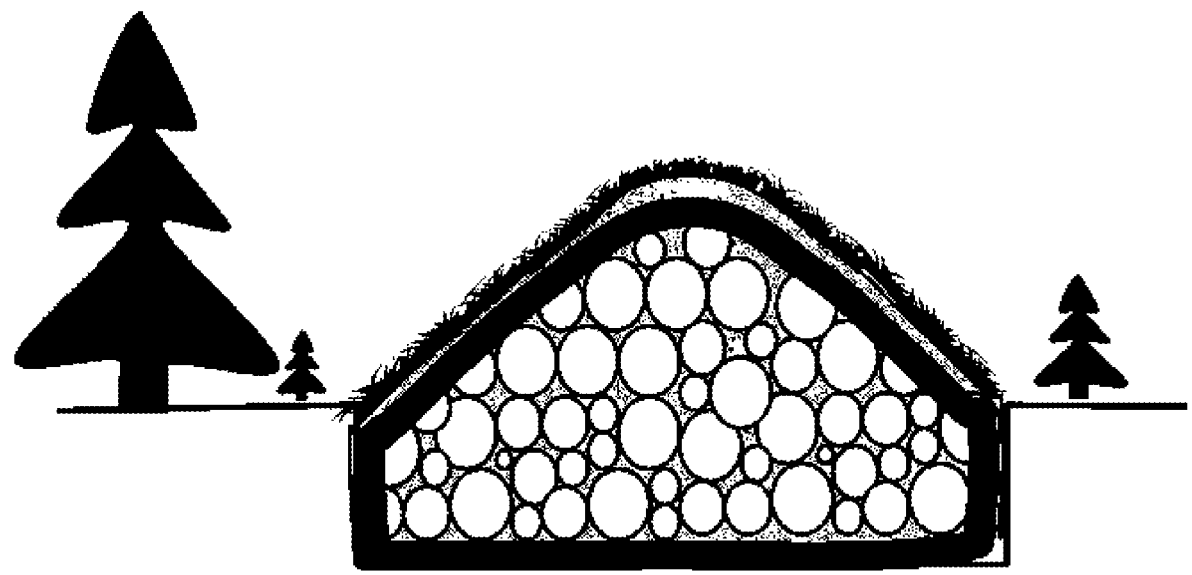
FIG. 14 is a diagram illustrating another method for wood storage according to an embodiment of the present disclosure, wherein. wood is buried in-situ with mound.

This applies to in-situ collection and burial on the forest floor (FIG. 13 and FIG. 14). It is distributed. The cut or collected wood can be hauled with a forwarder to the burial site, and usually does not involve trucking the logs for long-distance. Because the need to seal the site before significant degradation, each site will have limited size compared to the large-scale facilities discussed later.

1) The buried wood should be either completely under the lowest water table of dry season, or completely above the highest water level during wet season.

2) If the soil has very low permeability such as clay, it may be allowable to have the buried wood subject the seasonal water table fluctuation, but its permanence will be reduced somewhat.

3) The low permeability may be achieved by using clay sourced somewhere else, which would increase the cost. The cost may be significant as individual burial trench is small but still needs sufficiently amount of clay on the sides, thus expensive per unit of biomass buried. This method is more economical for large facilities.

4) If none of the above is practical, have soil layer on top as thick as practically possible (meters).

5) Use liner on the upslope side of water flow when significant.

Figure 15:
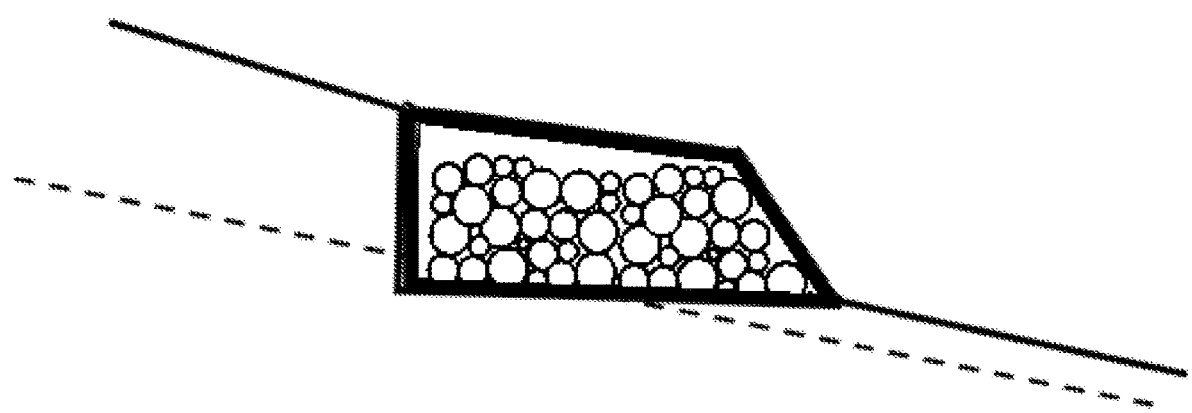
FIG. 15 is a diagram illustrating another method for wood storage according to an embodiment of the present disclosure, wherein, wood is buried on a slope.

6) Burial above ground or semi-above ground on a slope (FIG. 15). The up-slope side is cut to create room for wood burial. Soil is piled back on top. Because of the slope, the result is a terrace or sloping terrace. Sealing on top and the upslope side is recommended.

2.2.2 Large-Scale Burial Facility for Above Ground or Semi-Above Ground Storage

To accommodate wood material of a variety of sources such as urban waste wood, forest residues, as well as logs collected from a broader region, large facilities can be built to handle the material efficiently. To construct such a facility (FIG. 16), 1) Firstly, estimate the sustainable rate of wood source from a region.

2) Then a suitable site is selected, with size commensurate the estimated wood source.

3) The suitability of the site is based on assessment of site characteristics, including topography, hydrology, climate, environment, economics and other relevant factors.

4) Then soil is excavated to form a large pit, with the soil laid on the side. The organic containing topsoil (organic containing) should be excavated first, separate from lower-level soil, and put back in at the last on the surface, to minimize providing nutrients and substrate for decomposers.

5) The pit will be divided into multiple sections (cells). To minimize any degradation before the closure of the cell, wood material is trucked over and laid down in the cell before moving on to the next cell. After fully filled, the section is covered with a layer of soil and closed. The cell size is such that it can be filled, ideally in less than a year of the first dump, and the shorter the better. The optimal cell size can be determined by balancing wood sourcing rate and engineering cost (larger cell will be more space efficient and cheaper per unit mass of wood stored). Different quality material should be separately buried in different cells as they may have different durability, for example, logs, woodchips, old furniture should be separated.

6) Wood material, especially woodchips can be pre-treated to extend the storage lifetime. For example, the treatment material can be contained inside a pond on site. Woodchips can be dipped into the pond, packed into easy-to-handle units after or before treatment. The preserves for treatment can be wax or other commonly used wood preserving chemicals. Woodchips can also be charred with a charcoal-making process on site. Another technique is to spray over the wood, especially the cut surfaces.

7) Use the excavated local soil to cover the buried wood if it has low permeability such as clay. The permeability should be lower than $10^{-8}$ m/s, and preferably less than $10^{-9}$-$10^{10}$ m/s. If clay is not available on site, source it from somewhere else.

8) If covering soil is sourced from outside or the soil excavated is not reused for refilling or covering, wood can be simply piled up without excavation. This may be a preferred approach if the water table is very shallow and fluctuates significantly so that it's difficult to keep the buried wood outside the fluctuating zone.

9) Where the topographical slope is significant, line the upslope-facing side to prevent water from moving laterally through the buried wood, in order to minimize episodic reoxygenation of the burial environment.

10) The base of the pit should be above the local water table at its highest level to avoid fluctuating water-air boundary bringing oxygen.

11) If considering all factors for site selection, the water-level requirement (either completely above the seasonal highest water level or completely below the lowest seasonal level) cannot be satisfied, and the local soil does not have very low permeability, one can use clay to enclose the pit completely with sufficient thickness (greater than 0.3 meter, ideally 1 meter or more) on all sides.

12) After the facility is enclosed, grass or trees with shallow roots can be allowed to grow back, and the land can then be used as pasture for grazing animals, cropland, park, photovoltaic solar farm, or combination of the above.

Figure 17:
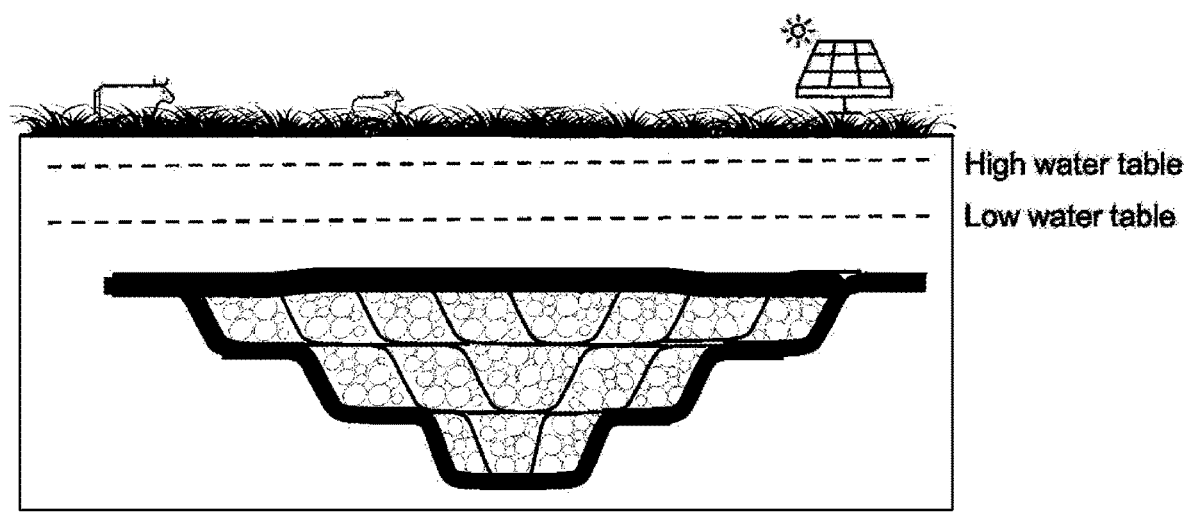
FIG. 17 is a diagram illustrating another method for wood storage according to an embodiment of the present disclosure, wherein, a large-scale wood burial facility underground (pit) is provided. After closing of the top, grass and shallow rooted trees can be allowed to grow, then used as park, grazing land, cropland, solar farm, or a combination thereof.

2.2.3 Large-Scale Burial Facility for Storage Underground

Where water table is near surface, the wood can be buried completely underground below the lowest level of fluctuating water table (FIG. 17).

1) Such places are typically low-lying land with also little lateral transport, so sealing with clay may not be necessary. These places also tend to have silty soil as they are formed by alluvial/fluvial sedimentation.

2) In the case of a valley, there may be strong one directional flow. In this case, upslope direction should be lined with clay or synthetic liner to minimize water flow in the burial chambers.

3) Similar methods can be applied to bury in abandoned mine.

2.3 Above-Ground Storage in Shelter

Above-ground storage facilities can be built to store wood. They can be either large-scale facilities that collect wood from a wider area, or small to medium size in-situ facilities that collect wood from the local harvest.

2.3.1 Large-Scale Centralized Shelter Facilities

Figure 18:
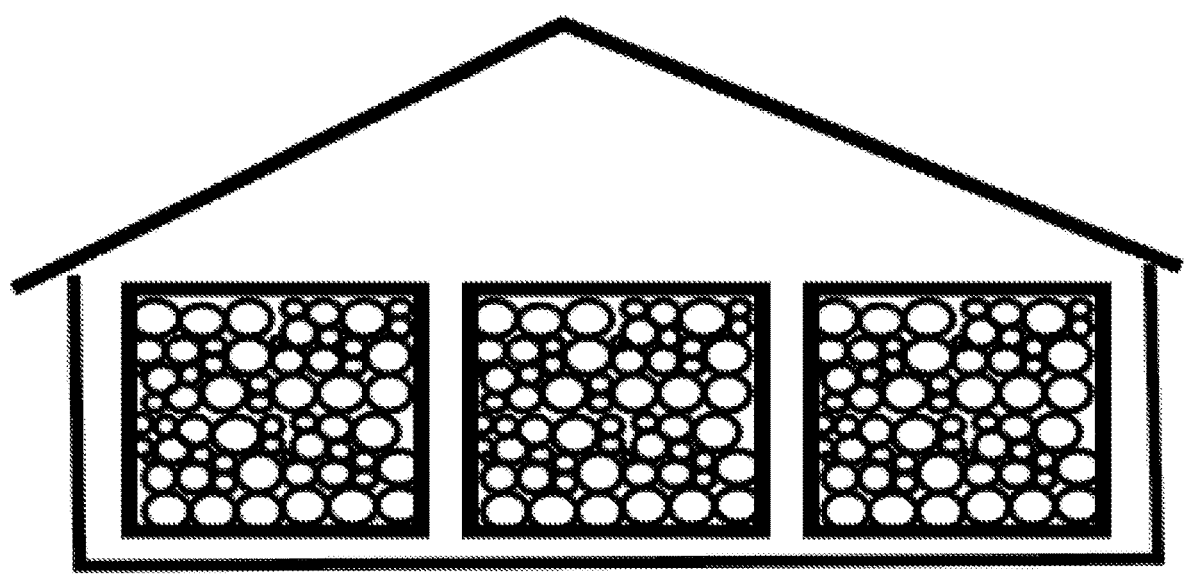
FIG. 18 is a diagram illustrating another method for wood storage according to an embodiment of the present disclosure, wherein, managed large shelter for above ground storage is provided.

These are warehouse-like structures that shelter the wood from rain, wind and other elements (FIG. 18). Inside each shelter, cells consist of scaffolding-like holding structure made with metal or wood posts are built to hold logs or woodchip stacks. There is space in between cells to allow loader to pass. The loaders may be electric battery powered like fork-lift. As an example, the dimension of each pile can be 10-meter width, 10-meter height, and 10-100 meter length, with 5 meter spacing in between piles (cells). Clearly, other reasonable designs are also possible. Multiple shelters can be built at the same site, with each shelter housing many cells.

Fire-resistant synthetic liners are used to cover each individual cell. For best preservation, each pile is sealed by bonding/melting/gluing pieces of covering liners together to form an air-tight enclosure. Sealed cells will soon be devoid of oxygen as it gets consumed quickly by only a small amount of decomposable organic matter in the pile.

Alternatively, a layer of soil can be used to cover up the logs instead of synthetic material. Soil has the advantage of been naturally fire-resistant. It may be messier to handle than synthetic material and may be more expensive to maintain. The soil is best reinforced with cut straw or other material, similar to traditional mud house. Clay is preferred as it is stronger when dries. Other soil types should work too.

Because such a facility is regularly monitored, any structural degradation such as peeling of soil wall (or damage in synthetic cover) can be repaired.

In such a managed state, woodchips can potentially be kept almost as well as whole logs. It also lends itself to pre-treatment, for example, dipping into wax or other protective material before storage.

2.3.3 In-Situ Shelter

Figure 19:
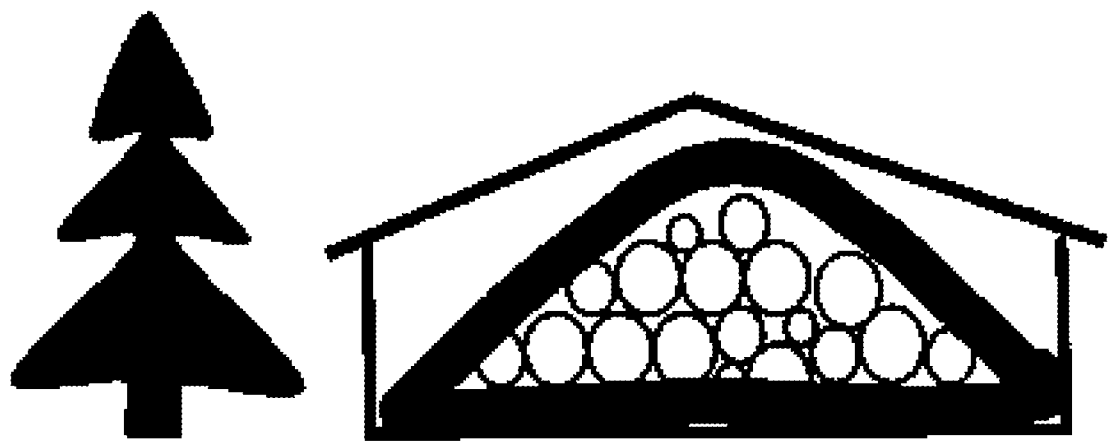
FIG. 19 is a diagram illustrating another method for wood storage according to an embodiment of the present disclosure, wherein, an in-situ shelter is provided.

Above ground in-situ shelter can be made. As shown in FIG. 19, Synthetic material can be used, Alternatively, soil layer can be used. Unlike large-scale facility, the shelter could be a simple roof to shelter out rain. Everything can be made with local organic material. Metal structure and synthetic cover can also be used. Maintenance may be required on multi-year timescales as damage inevitably occurs. The choice will depend on the balance of structural stability, cost and environmental consideration.

Compare to in-situ mound structure method, wood inside the in-situ shelter is completely above ground. Mound burial can of course also be all above ground, in which case soil will come from somewhere else (surrounding or exported from far).

2.4 Underwater Storage

Figure 22:
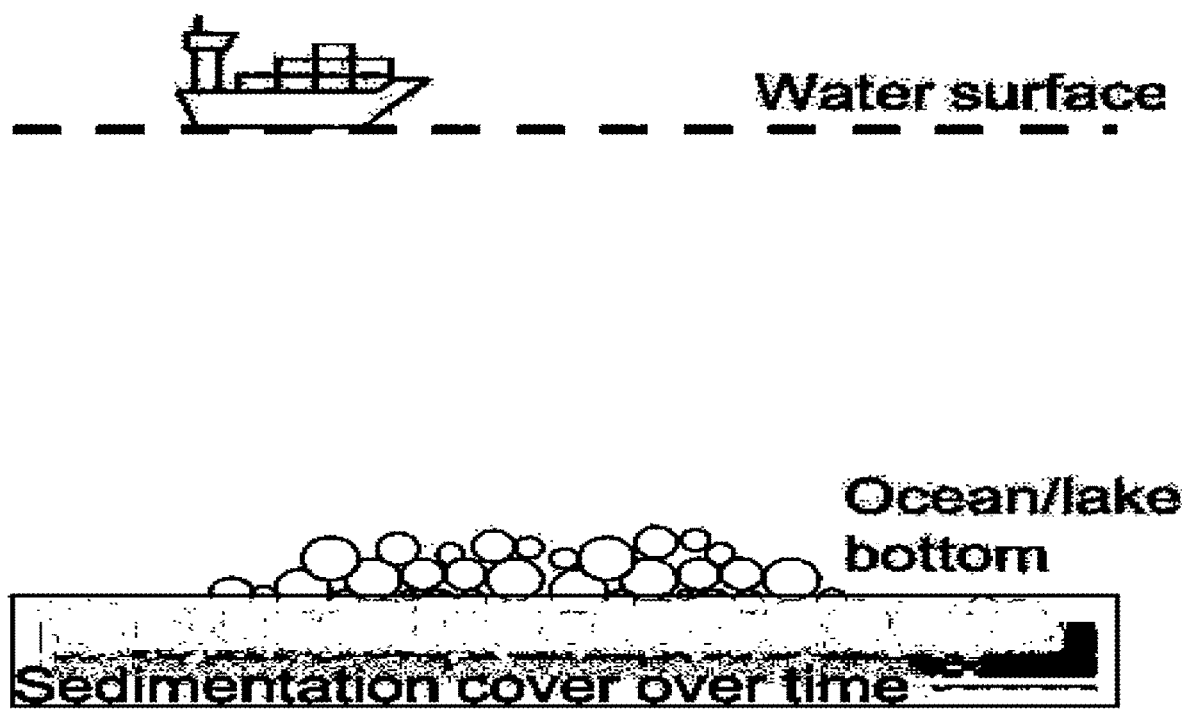
FIG. 22 is a diagram illustrating another method for wood storage according to an embodiment of the present disclosure, wherein, wood is submerged under stagnant water bodies.

As shown in FIG. 22, wood can be stored under water. Water body contains much less oxygen than air, and with the lack of major wood decomposers like white rot fungi, water provides an environmental for wood preservation. However, for the climate timescale of hundreds of years or longer, additional measures will be needed to ensure wood preservation. Stagnant and anaerobic water bodies will be best, while flowing water will need special treatment.

1) Bottom of stagnant water bodies. Examples include the Black Sea, the Great Lakes. Logs are collected from surrounding regions, rafted or transported to the water body and sink to the bottom. For logs that are lighter than water, weights such as rocks may be tied to the logs and help them sink to the bottom. In stagnant water with also high sedimentation rate, the logs will also buried in silty sediments after some years, creating an excellent condition for preservation.

2) Water bodies with less ideal condition for wood preservation. As marine borers and other organisms may attack wood, protection will be needed. Wood logs can be grouped into large bundles and wrapped in synthetic liners and sink to the bottom with weight. While the bundles can be initially sealed, it may be difficult to guarantee that it does not break after a long-time. The cover should still nonetheless provide significant protection to slow down possible decomposition.

To determine whether a water body has very low oxygen, oxygen sensors can be used to measure the oxygen level at the bottom. Sedimentation rate can also be measured. Such data are then used to determine the suitability.

2.5 Dry Storage

Wood can also be stored in dry regions such as desert or semi-desert. The requirement for additional protection, either above-ground shelter or underground burial will be significantly less demanding than in wet regions. A main limitation is wood availability as wood will be transported from other regions or closer-by mountains. In some circumstance this may be viable.

1) Above ground shelter, either large-scale or small scale as described above. Given that wood likely comes from somewhere else, large-scale facility may be most cost effective.

2) Underground. Because low water content and movement, simple burial with local soil may be sufficient to keep the wood semi-permanently. As desert soil tends to be shallow due to slow weathering, mound may be a more practical method for storing sufficient amount of wood in each enclosure. Mound also has the advantage of drain occasional rainwater away more efficiently. Similarly, as for above ground shelter, large-scale facility will be more cost effective.

2.6 Cold Storage

Because of the extremely slow decomposition rate in sub-freezing condition, wood can be stored in permanent cold regions, for example, the coastal regions of Antarctica.

Wood will be sourced from different regions. Wood is collected, bundled, and transported to ports. Transportation can be done by rafting down river networks or by trucks or trains. The wood bundles are loaded onto container ships/barges at the ports, then shipped to Antarctica. Shipping cost to Antarctica is not necessarily formidable because of the efficiency of today's trans-oceanic shipping. Typically, trans-oceanic container shipping costs only $\frac{1}{20}^{th}$ of on land trucking. Most cost and carbon footprint can be sufficiently low. Once at Antarctica, the wood bundles are unloaded and piled up from the ground. The location should be solid ground, not part of the icesheet or iceshelf to avoid ground movement.

2.7 Combination

Any combination of above can be made to take advantage of multiple factors, for example, bury in dry regions can lead to even more permanent storage, or compensate for weaknesses in permanence and cost.

2.8 Economics of Storage Facilities 2.8.1 Wood Collection for Large-Scale Storage Facility Large-scale facilities are particularly suitable for diffused wood sources. Opportunistic sources are not reliable individually. However, over large enough area, there will be a near steady supply for a large facility.

As an illustrative example, we consider an area of 1000 km$^2$ (100,000 ha), typical size of a county in the eastern United States, for example, 1290 km$^2$ for Prince George's County, Maryland. How much wood is available sustainably from such a region? We start from a wood availability of 1.1 tC/ha/y, based on a modest sustainable harvest rate for temperate forest, which is about 10% of a temperate forest's annual net primary production (NPP; Zeng et al., 2012).

Even though waste wood sources vary widely, on long time scale and over large enough area, it is still fundamentally constrained by sustainable wood production rate. We also made the assumption that significant fraction of the land is wooded, which is not unreasonable, especially because urban trees can be used this way when they are removed. If the region has major wood imports or exports, this assumption will need to be adjusted. Where wood is already in major demand for lumber and pulpwood, this potential is reduced. However, residues from such operation can be utilized for carbon sequestration, and other potential sources such as small forest plots may become available when there are economic incentives that are otherwise unused. We note that if wood from plantation, especially fast-growing species, significantly higher rate can be achieved.

The wood availability of 1.1 tC/ha/y corresponds to approximately 4 t $CO_2$ or 4 tonne of wet biomass per hectare per year. Over the 1000 km$^2$ region, 400,000 tonne of biomass each year is available. After 10 years, a total of 4 MtB could be collected.

Figure 20:
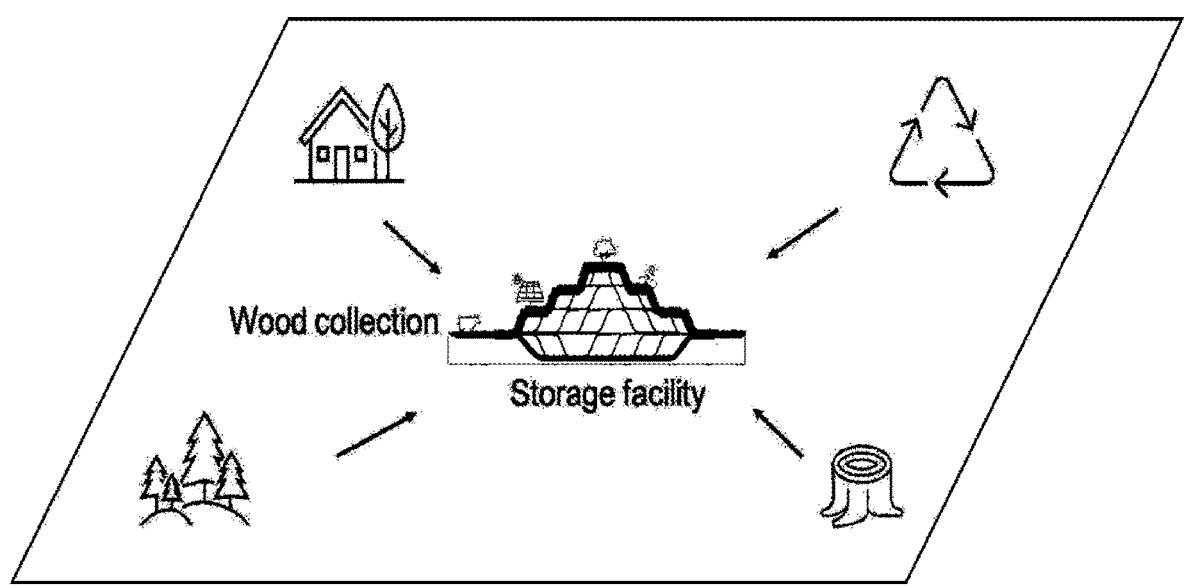
FIG. 20 is a diagram illustrating another method for wood storage according to an embodiment of the present disclosure, wherein a centralized wood storage facility collects from a variety of sources such as natural waste wood from surrounding region.

FIG. 20 illustrates a centralized wood storage facility collects from variety of sources such as natural waste wood from surrounding region.

2.8.2 Size of Large Storage Facility

What size of a large-scale burial facility will be needed to accommodate this amount of wood? 4 Mt of biomass has about 4 million cubic meters of volume. This volume can be of dimension 40 ha×10 m (area×height), or a taller one with smaller area 10 ha×40 m. 40 ha (100 acre) is the typical landfill property size (for example, 50 ha for Brown Station landfill, Prince George's County, Maryland), can thus accommodate the wood collected in the area of the county for 40 years. Given that the shape of the burial space is tapered (smaller upward for above-ground hill-style, and smaller downward underground for below ground pit), 40 m is an average height/depth. Also consider some extra space needed for soil filling, the top of the hill will be somewhat taller than 40 m. There is no fundamental reason a hill cannot be made this tall, which would provide a nice vista point on flat land and recreational space if used as a park after sealing off. If desired, it can be made lower but with a larger base area to bury the same amount of wood. A few smaller hills can also be made on the same site with same management.

In summary, an area of 40 ha (typical landfill size) can bury 16 Mt of wood, collected from the surrounding area of 100 km$^2$ (typical county size in the eastern US) over a period of 40 years. The resulting 'hill' or 'pit' would occupy a total volume somewhat larger than 40-hectare area by 40-meter height (100 acre by 130 feet). Several stages of burial should be conducted at shorter time interval, say every 5-10 years to seal off the already buried wood.

It is also possible to use a similar size facility to bury wood collected from a larger area, for example the surrounding counties. In this case, the facility can be filled to capacity within 10 years. The additional cost of transporting wood material over longer distance, for example within 100 km may still be quite economical. The optimal size of the wood burial facility needs to strike a balance between size of wood source region and the cost of facility construction and transportation, depending on the local circumstances.

Figure 21:
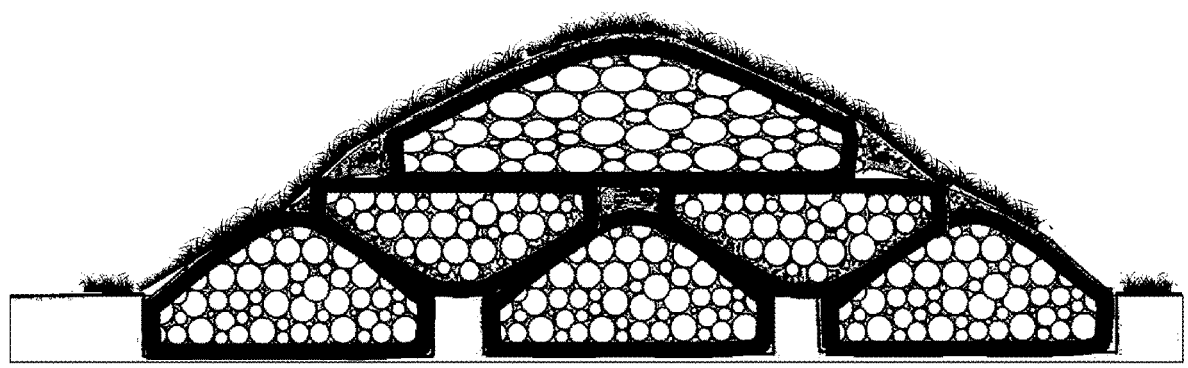
FIG. 21 is a diagram illustrating another method for wood storage according to an embodiment of the present disclosure, wherein a super-size facility consisting of multiple burying units built horizontally and vertically on top of each other is provided.

Finally, several such facilities can be built on the same site next to each other. Additionally, it is also possible to build more on top and in between existing ones (FIG. 21 illustrates a super-size facility consisting of multiple burying units built horizontally and vertically on top of each other), This will increase overall height. This will enable the facility to run much longer beyond a few years. The overall cost will also be lower and save space to create new facility.

2.8.3 Economics of Large Facility

On 40-hectare of land, with a hill more than 40 meters tall or a ditch similarly deep, an effective internal space of 16 million cubic meters can store 16 Mt of woody biomass. At a carbon price of $50/tCO$_2$, the value for 16 Mt CO$_2$ is $800 million. The construction of the facility would cost $10-50 million. Should the wood source come from wood harvest for carbon sequestration, the cost would be $14/tCO$_2$ (Zeng, 2008) plus transportation for a total of $20/tCO$_2$ assumed here. Further including other costs such as land and facility management, it could have more than 50% profit margin. It is important to note that, for waste wood source, even in the absence of carbon price, disposal of wood is already economically viable as revenue is enough to pay itself via tipping fee.

TABLE 1

Cost breakdown of a prototype large facility that collects and stores 16 Mt biomass.

| | Land value | Construction | Operation | Wood source (waste) | Wood source (harvest) |
|---|---|---|---|---|---|
| Unit cost | $10,000/acre for 100 acre | | | −$1 to 0 | $20/t |
| Total cost (million USD) | 1 | 10-50 | 10? | −16 to 0 | 320 |

TABLE 2

Economics of a prototype large facility on a carbon market. One tonne of wet biomass corresponds to approximately 1 t CO$_2$ sequestered.

| Biomass stored | Land area of storage facility | Cost | Value of carbon credit at $50/tCO$_2$ |
|---|---|---|---|
| 16 million tonnes | 40 ha (100 acre) | $21-341 million | $800 million |

2.8.4 Economics of In-Situ Small Facility

In-situ storage on the forest floor, near the logging land site, or on the roadside where wood is harvested has the advantage of minimizing transportation cost and other benefits. A disadvantage is the cost of moving machinery to the site and other overhead costs of each operation. It may be most efficiently carried out by a company that goes around a larger area consisting of many smaller sites with multiple ownerships. Materials and machinery can be planned out and used most efficiently.

3. Wood Treatment Method

Before storage, wood can be treated with chemical and physical methods through pressure treatment, liquid preserves or charring before wood is stored to prolong the preservation time.

Preservatives are the chemical which enhances the durability of timber treated with different methods. The following characteristics of preservatives are the most important: High toxicity towards wood destroying organisms; Permanence in the treated wood; Ability to penetrate deeply in wood; Freedom from deleterious effects on the wood itself; Without harmful effects on the operatives and those who handle the treated wood.

The effectiveness of the preservative treatment depends not only on the nature of the preservative but also on the amount taken up per unit area of the wood. This may be achieved by selecting the appropriate method of treatment of wood. There are five types of treatment method can be used: pressure method, brushing/coating method, dipping method, spraying method and sap-replacement method.

4. Project Evaluation, Monitoring and Verification

Figure 23:
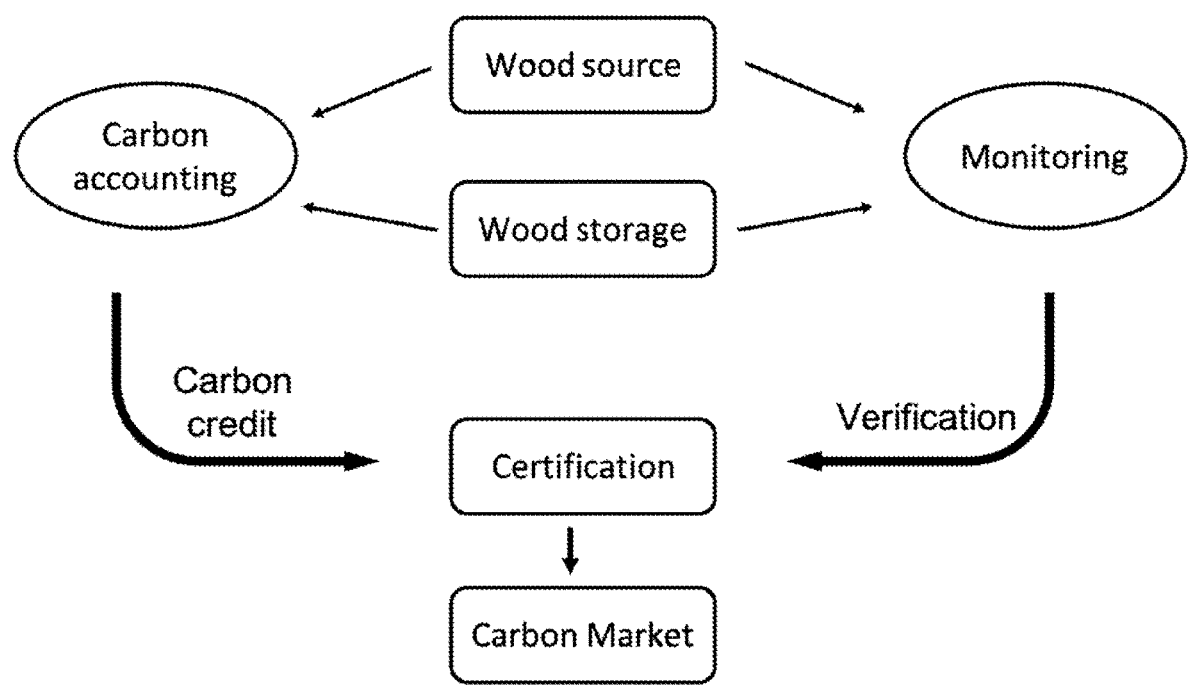
FIG. 23 is a diagram illustrating a system for carbon accounting, certification, and carbon credit transaction according to an embodiment of the present disclosure, wherein, monitoring and verification of both wood sourcing and storage will ensure the net carbon value.

FIG. 23 is a diagram illustrating a system for carbon accounting, certification, and carbon credit transaction according to an embodiment of the present disclosure, wherein, monitoring and verification of both wood sourcing and storage will ensure the net carbon value.

4.1 Storage Project Evaluation and Monitoring

A project is assessed and evaluated in the following categories of factors

The trench/mound burial condition will be evaluated based on several factors, including
  1) the depth of the soil
  2) the permeability of the soil
  3) the infertility of the soil
  4) the dimension of the trench
  5) biomass and carbon content of buried wood
  6) regrowth and maintenance condition on the surface (grass, crop, park, bare, etc.)

The surrounding burial site condition for preservation will be evaluated for the following factors:
  1) site climatological temperature: annual mean and seasonal range.
  2) site climatological humidity condition: soil moisture dry or wet, water-logged or not, water table, for both annual mean and seasonal cycle For sample sites, sensors will be installed to directly observe underground oxygen level, temperature, moisture, as well as potential CO$_2$/CH4 leakage rate. The site-specific data can be used to calibrate carbon accounting model parameters.

The burial site environmental impact factors include:
  1) Disturbance to the site: ecological functioning; stability of soil; impact on hydrology such as loss of riparian buffer.
  2) Reduced or enhanced value for other use. 'Eye sore' if close to community, in which case mitigation strategy will be developed. A positive example is to build a park on top. Yet another positive example is the reclamation of abandoned mines that are used for wood burial.

Through the assessment of the above factors, both quantitative measures and qualitative criteria will be produced:
  1) The amount of carbon sequestered.
  2) An estimated longevity range of buried carbon in years. This will be expressed as 5% decay time and/or half-life time, synthesized using a process-based wood decomposition model that takes into account of the biology of wood decomposition and the preservation condition above as model parameters. The model, after been applied to past data under a variety of conditions as well as future anticipated project data, is expected to continue to improve and provide estimates with greater and greater confidence.
  3) An environmental soundness indicator will be given as excellent, good, fair, poor.
  4) Representative sites will be revisited at a regular frequency, typically once a year. The site will be checked for its maintenance and environmental impact. Measurement of underground condition will be collected, as well as direct sampling of buried wood and lab testing for its condition. Adjustment of model parameters and longevity estimates will be updated accordingly.

4.1.1 Main Categories of Evaluation Outcome

At the conclusion of project/facility evaluation, major categories will be reported as:

1) Carbon Stored: Large (>100,000 $tCO_2$); Medium-large (10,000-100,000 $tCO_2$); Medium (1000-10,000 $tCO_2$); Small (<1000 $tCO_2$).

2) Distributed or centralized storage.

3) Permanence: ultra permanent (>10,000 years), permanent (>1000 years); semi-permanent (>100 years); short-term (decades).

4) Cost: High (>$100/$tCO_2$); Medium ($50-100); Low (<$50).

5) Environmental and societal impact (source, operation, storage): beneficial; small negative that can be mitigated; modest impact; severe impact.

6) An environmental soundness indicator will be given to a project: excellent, good, fair, poor.

4.2 Certification

Based on the evaluation criteria above, certificate will be issued for projects that are considered viable. The amount of carbon sequestered will be quantified in unit of tonne of $CO_2$, via life cycle analysis (LCA) using monitoring data and full carbon accounting of both wood source and wood storage. More detailed information on the temporal change of net carbon gain will also be provided. The longevity of the sequestered carbon, environmental impact, co-benefits will be described, and categorical score will be given. An overall score/rating will be given. This information will allow carbon credit to be obtained. The carbon credit can then be exchanged on a carbon trading market.

Figure 26:
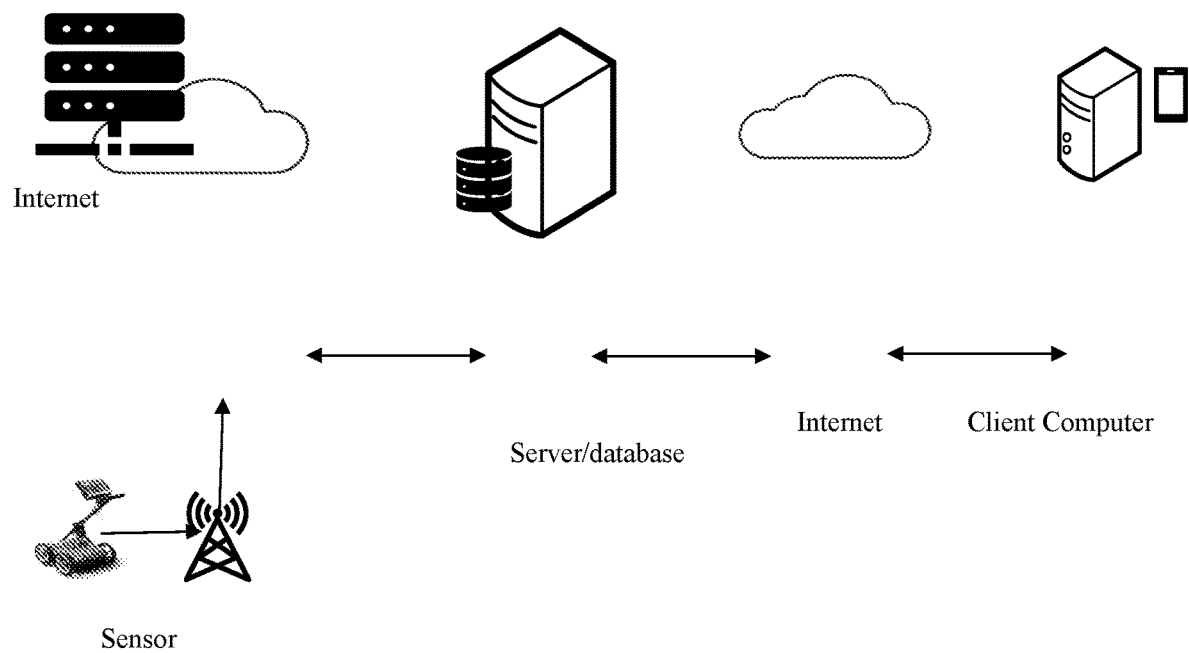
FIG. 26 is a diagram illustrating a network-based wood and carbon storage monitoring, accounting and transaction system according to an embodiment of the present disclosure.

As shown in FIG. 26, a system for storage project evaluation and monitoring can be developed, the system comprising:

1) A central processor accessible on a computer network.

2) At least one sensor in communication with the central processor, wherein each of the at least one sensor is operably associated with one of the at least one wood storage assets, the sensor being configured to transmit wood storage information relating to the at least one wood storage asset to the central processor.

3) A client processor in communication with the central processor, the client processor configured to allow for inputting and downloading information from the server.

4) A wood storage inventory database in communication with the central processor, the inventory database configured to store:

A) The factors for evaluation of trench/mound burial condition including the depth of the topsoil, the permeability of the soil, the infertility of the soil, the dimension of the trench, biomass and carbon content of buried wood, regrowth and maintenance condition on the surface (grass, crop, park, bare, etc.).

B) The factors for evaluation of surrounding burial site condition, including site climatological temperature: annual mean and seasonal range, site climatological humidity condition: soil moisture dry or wet, water-logged or not, water table, for both annual mean and seasonal cycle.

C) Collected data for underground oxygen level, temperature, moisture, as well as potential $CO_2/CH_4$ leakage rate.

D) The burial site environmental impact factors including disturbance to the site: ecological functioning; stability of soil; impact on hydrology such as loss of riparian buffer; reduced or enhanced value for other use.

5) Software associated with the central processor, the software configured to generate a project report including the following information:

A) The amount of carbon sequestered: Large (>100,000 $tCO_2$); Medium-large (10,000-100,000 $tCO_2$); Medium (1000-10,000 $tCO_2$); Small (<1000 $tCO_2$).

B) Distributed or centralized storage.

C) Permanence: ultra-permanent (>10,000 years), permanent (>1000 years); semi-permanent (>100 years); short-term (decades).

D) Cost: High (>$100/$tCO_2$); Medium ($50-100); Low (<$50).

E) Environmental and societal impact (source, operation, storage): beneficial; small negative that can be mitigated; modest impact; severe impact.

F) an environmental soundness indicator will be given to a project: excellent, good, fair, poor.

6) Certificate will be issued for projects that are considered viable. Of certified projects, the amount of carbon sequestered, longevity/durability of the sequestered carbon, environmental impact, co-benefits will be described, and categorical score will be given. An overall score/rating will be given.

5. Carbon Credit Accounting and transaction for wood storage project

As shown in FIG. 26, a network-based wood and carbon storage monitoring, accounting and transaction system can be developed, the system comprising:

1) a central processor accessible on a computer network.

2) at least one sensor in communication with the central processor, wherein each of the at least one sensor is operably associated with one of the at least one wood storage assets, the sensor being configured to transmit wood storage information relating to the at least one wood storage asset to the central processor.

3) a wood storage inventory database in communication with the central processor, the wood storage inventory database configured to store: Wood storage asset information relating to a plurality of assets at a plurality of locations, wherein the asset information comprises at least one of location, time, owner, mass of wood storage, type of wood, storage method etc.

4) carbon accounting software associated with the central processor, the carbon accounting software configured to calculate and track a calculated amount of carbon stored relating to at least one of the wood storage assets based on information stored in the wood storage inventory database.

5) a carbon storage database in communication with the central processor, the carbon storage database configured to store the amount of carbon stored in at least one of the wood storage assets at a given time.

6) $CO_2$ equivalents conversion software associated with the central processor, the $CO_2$ equivalents conversion software configured to calculate a $CO_2$ equivalent amount based on the amount of carbon stored relating to at least one of the wood storage assets.

7) a client processor in communication with the central processor, the client processor configured to allow for inputting any portion of the wood storage asset information and the carbon credit information of an enterprise or an individual, wherein the carbon credit information comprises at least one of a calculated carbon credit debt and a calculated carbon credit surplus relating to the at least one enterprise or individual who owns at least one of the wood storage assets.

8) carbon credit tracking software associated with the central processor, the carbon tacking software configured to calculate and track the carbon credit information relating to at least one of the wood storage assets or relating to at least one of the enterprise or individual.

9) carbon credit transactional software associated with the central processor, the carbon credit transactional software configured to receive the current market value of a carbon credit via the computer network, purchase carbon credits based on the calculated carbon credit debt, sell carbon credits based on the calculated carbon credit surplus.

10) a client processor in communication with the central processor, the client processor configured to allow accessing, querying, downloading, and requesting information relating to any of the asset information and the carbon credit information.

In addition, the above-described systems for wood harvest and storage, carbon sequestration and carbon management including but not limited to the system to determining and optimizing wood sourcing from opportunistic sources and sustainably managed timberland or forest, system for wood sourcing monitoring, system for wood and carbon storage monitoring, carbon accounting, carbon credit certification and carbon credit transaction can all be cloud-based systems. For example, a cloud-based system for wood sourcing monitoring for sustainably managed wood sources can be adopted, wherein, the hardware, software and other supporting infrastructure are managed by a cloud provider; either public cloud, private cloud or hybrid cloud can be used. The stakeholders, for example, logging and wood harvesting operator, can rent IT infrastructure (IaaS)-servers and virtual machines (VMs), storage, networks, operating systems from a cloud provider on a pay-as-you-go basis; or they can use serverless computing or use cloud computing service (PaaS) that supply an on-demand environment for developing, testing, delivering and managing their software applications related to wood sourcing, it would be easier for developers to quickly create web or mobile apps, without worrying about setting up or managing the underlying infrastructure of servers, storage network and database needed for development; or they can use Software as a service (SaaS) provided by a cloud provider where the software applications are delivered over the Internet on demand and typically on a subscription basis, cloud provider host and manage the software application and underlying infrastructure, and handle any maintenance such as software upgrades and security patching.

In addition, the above-described systems for wood harvest and storage, carbon sequestration and carbon management including but not limited to the system to determining and optimizing wood sourcing from opportunistic sources and sustainably managed timberland or forest, system for wood sourcing monitoring, system for wood and carbon storage monitoring, carbon accounting, carbon credit certification and carbon credit transaction can all be blockchain-based systems.

For example, block-chain based wood source solutions can be adopted, this wood source data would be timestamped and tamper proof, ensuing privacy, data protection and fair competition. Because blockchain is decentralized, this data would not sit on a central database, it would reside with the individual forest owners who would give permission for others to see their data. With its enhanced data security and traceability, blockchain can help tackle trust in wood source supply chains to guarantee specific attributes and other relevant identity information, and can facilitate real-time track- and trace wood source audits. It improves cost-efficiency, transparency, accuracy, connectivity and accessibility for all stakeholders, for example, forest owners, logging and wood harvesting operators, financers and investors.

In another example, blockchain based carbon credit transaction solutions can be adopted. Blockchain technology provides a safe and reliable, efficient and convenient, open, and inclusive platform that is uniquely suited for implementing Carbon Credit transactions. The immutable cryptographically-secured distributed ledger on the Blockchain allows for reliable issuance and tracking of carbon credits. Public blockchains are easily accessible to small and medium-sized enterprises, reducing the entry threshold for the carbon trading market. Furthermore, the information provided by companies is transparent and accessible to everyone. Carbon credits can be transferred to the Blockchain by converting them into digital tokens distributed to carbon credit generators after properly validating their projects. Buyers and sellers of carbon credit will use a decentralized exchange platform on Blockchain to trade Carbon credits. The price will be determined by market dynamics driven by supply and demand. Smart Contracts can be used in the blockchain based carbon credit transaction solutions.

The systems and methods provided by the present disclosure can be utilized by various players in the industry chain. For example, a plantation owner can utilize the methods and systems to manage forest through using the information related to carbon content and various other conditions of forest, the plantation owner is able to evaluate whether to use the plantation for a wood storage project to obtain carbon credit or use it for other purposes such as paper or lumber; In another example, a logging and harvest operator can utilize the systems and methods to evaluate which forest resources to be used for logging and which forest resources to be used to harvest for a wood storage project and select resources in an economically and environmentally sound manner; In another example, an storage facility owner can utilize the systems and methods provided by the present disclosure to determine how to source, how to calculate carbon value of a storage project and cost for transporting and treating of wood and how to construct a storage facility. In another example, players in the field of monitoring and verifying a carbon storage project can use the systems and methods of the present disclosure to measure gases, carbon content of a forest or a wood storage project, conduct sampling and lab experiments and providing wood storage project certification; In another example, entities such as carbon credit trade facilitators can utilize the systems and methods provided by the present disclosure to conduct carbon accounting and provide a carbon credit trading platform; In another example, information system providers can utilize the systems and methods of the present disclosure to build a wood storage project information system, providing information related to wood sourcing, wood storage and carbon credit to others and providing related information system services. Likewise, systems and methods provided by the present disclosure can be utilized by entities that manages and coordinates plantation, wood harvest and collection and facilities through the whole wood supply and storage production chain.

For the convenience of description, the components of the apparatus may be divided into various modules or units according to functions which may be separately described. For example, a submodule can be forest growth model, another one can be a model on the decomposition of stored wood. Certainly, when various embodiments of the present disclosure are carried out, the functions of these modules or units can be achieved utilizing one or more equivalent units of hardware or software as will be recognized by those having skill in the art.

The various device components, units, circuits, blocks, or portions may have modular configurations, or are composed of discrete components, but nonetheless can be referred to as "modules" in general. In other words, the "components," "modules," "circuits," "portions," or "units" referred to herein may or may not be in modular forms, and these phrases may be interchangeably used.

Persons skilled in the art should understand that the embodiments of the present disclosure can be provided for a method, system, or computer program product. Thus, various embodiments of the present disclosure can be in form of all-hardware embodiments, all-software embodiments, or a mix of hardware-software embodiments. Moreover, various embodiments of the present disclosure can be in form of a computer program product implemented on one or more computer-applicable memory media (including, but not limited to, disk memory, CD-ROM, optical disk, etc.) containing computer-applicable procedure codes therein.

The operations, steps including intermediate steps, and results from the computer system can be displayed on a display screen for a user. In some embodiments, the computer system can include the display screen, which can be a liquid-crystal display (LCD) or an organic light-emitting diode (OLED) display screen.

Various embodiments of the present disclosure are described with reference to the flow diagrams and/or block diagrams of the method, apparatus (system), and computer program product of the embodiments of the present disclosure. It should be understood that computer program instructions realize each flow and/or block in the flow diagrams and/or block diagrams as well as a combination of the flows and/or blocks in the 26 flow diagrams and/or block diagrams. These computer program instructions can be provided to a processor of a general-purpose computer, a special purpose computer, an embedded memory, or other programmable data processing apparatuses to generate a machine, such that the instructions executed by the processor of the computer or other programmable data processing apparatuses generate a device for performing functions specified in one or more flows of the flow diagrams and/or one or more blocks of the block diagrams.

These computer program instructions can also be stored in a computer-readable memory, such as a non-transitory computer-readable storage medium. The instructions can guide the computer or other programmable data processing apparatuses to operate in a specified manner, such that the instructions stored in the computer-readable memory generate an article of manufacture including an instruction device. The instruction device performs functions specified in one or more flows of the flow diagrams and/or one or more blocks of the block diagrams.

These computer program instructions may also be loaded on the computer or other programmable data processing apparatuses to execute a series of operations and steps on the computer or other programmable data processing apparatuses, such that the instructions executed on the computer or other programmable data processing apparatuses provide steps for performing functions specified ill one or more flows of the flow diagrams and/or one or more blocks of the block diagrams.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

Processors suitable for the execution of a computer program such as the instructions described above include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

The processor or processing circuit, such as the cache and memory management circuit; can be implemented by one or a plurality of application specific integrated circuits (ASICs), digital signal processors (DSPs), 28 digital signal processing devices (DSPDs), programmable logic devices (PLDs), field programmable gate arrays (FPGA), controllers, microcontrollers, microprocessors, general processors, or other electronic components, so as to perform the above image capturing method.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of 29 communication networks include a local area network ("LAN") and a wide area network ("WAN"), an inter-network (e.g., the Internet), and peer-to-peer networks (e.g., ad hoc peer-to-peer networks).

Although preferred embodiments of the present disclosure have been described, persons skilled in the art can alter and modify these embodiments once they know the fundamental inventive concept. Therefore, the attached claims should be construed to include the preferred embodiments and all the alternations and modifications that fall into the extent of the present disclosure.

The description is only used to help understanding some of the possible methods and concepts. Meanwhile, those of ordinary skill in the art can change the specific implementation manners and the application scope according to the concepts of the present disclosure. The contents of this specification therefore should not be construed as limiting the disclosure.

In the foregoing method embodiments, for the sake of simplified descriptions, the various steps are expressed as a series of action combinations. However, those of ordinary skill in the art will understand that the present disclosure is not limited by the particular sequence of steps as described herein.

According to some other embodiments of the present disclosure, some steps can be performed in other orders, or simultaneously, omitted, or added to other sequences, as appropriate.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be 30 performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

In addition, those of ordinary skill in the art will also understand that the embodiments described in the specification are just some of the embodiments, and the involved actions and portions are not all exclusively required, but will be recognized by those having skill in the art whether the functions of the various embodiments are required for a specific application thereof.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or 31 imply these entities having such an order or sequence. It does not necessarily require or imply that any such actual relationship or order exists between these entities or operations.

Moreover, the terms "include," "including," or any other variations thereof are intended to cover a non-exclusive inclusion such that a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, the commodity, or the device including the element.

In the descriptions, with respect to device(s), terminal(s), etc., in some occurrences singular forms are used, and in some other occurrences plural forms are used in the descriptions of various embodiments. It should be noted, however, that the single or plural forms are not limiting but rather are for illustrative purposes. Unless it is expressly stated that a single device, or terminal, etc. is employed, or it is expressly stated that a plurality of devices, or terminals, etc. are employed, the device(s), terminal(s), etc. can be singular, or plural.

Based on various embodiments of the present disclosure, the disclosed apparatuses, devices, and methods can be implemented in other manners. For example, the abovementioned terminals devices are only of illustrative purposes, and other types of terminals and devices can employ the methods disclosed herein.

Dividing the terminal or device into different "portions," "regions" "or "components" merely reflect various logical functions according to some embodiments, and actual implementations can have other divisions of "portions," "regions," or "components" realizing similar functions as described above, or without divisions. For example, multiple portions, regions, or components can be combined or can be integrated into another system. In addition, some features can be omitted, and some steps in the methods can be skipped.

Those of ordinary skill in the art will appreciate that the portions, or components, etc. in the devices provided by various embodiments described above can be configured in the one or more devices described above. They can also be located in one or multiple devices that is (are) different from the example embodiments described above or illustrated in the accompanying drawings. For example, the circuits, portions, or components, etc. in various embodiments described above can be integrated into one module or divided into several sub-modules.

The numbering of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation to encompass such modifications and equivalent structures.

What is claimed is:

1. A method for carbon sequestration and management through a wood storage project, comprising:
   determining sources of wood used for storage for carbon sequestration with an optimization technique performed by one or more processing circuits;
   calculating, with the one or more processing circuits, an optimized ratio between carbon sequestration efficiency and cost;
   preparing storage facilities with the optimized ratio;
   storing sourced wood in the storage facilities;
   monitoring, evaluating, verifying and certifying carbon credit for the wood storage project with the one or more processing circuits;
   conducting carbon credit trade for the wood storage project;
   determining forest wood sources used for storage based on time-dependent carbon accounting including:
      measuring forest carbon storage using at least one of diameter at breast height (DBH), species-dependent bolometric equations, satellite observations of tree coverage, height and biomass, targeted aerial observations from airplanes or drones, or ground observations with AI-assisted analysis of optical and infrared images;
      performing, with the one or more processing circuits, life cycle analysis (LCA) based on carbon cycle models that simulate forest growth for specified species, calibrated with biomass growth data to thereby obtain parameters and input of the LCA analysis;
      applying, with the one or more processing circuits, a predictive model to the measured forest carbon storage using a data assimilation technique;
      calculating, with the one or more processing circuits, a net carbon gain by adding the measured forest carbon storage to a predicted regrowing forest, subtracting a baseline forest, wherein the net carbon gain is used as a basis for the carbon credit; and
      determining, with the one or more processing circuits, opportunistic wood sources used for storage based on a wood storage value including at least one of a carbon credit value, a fire prevention value, a value for waste utilization, or a commercial value;
   performing, with the one or more processing circuits, a carbon accounting including:
      establishing a baseline including an assessment of lifetime of the sources of wood based on time scales including a half-life time, and a 5% decay time;
      assessing a lifetime of buried wood based on storage methods and environmental conditions, wherein the lifetime of the buried wood is classified into stop-gap (<20 years), short-term (20-100 years), semi-permanent (100-1000 years), permanent (>1000 years), and ultra-permanent (>10000 years);
      constructing a single-parameter model:

$$C = C_0 \exp\left(-\frac{t}{\tau}\right),$$

wherein C is a carbon pool size with an initial value $C_0$, t is time, and t is an e-folding decay time scale, or, constructing a multi-parameter model:

$$\frac{dC}{dt} = J(t) - \int_0^\tau J(t-\tau)\Gamma(\tau)d\tau,$$

wherein $\Gamma(t)$ is a gamma function and J is a continuous input added wood to the carbon pool with parameter values based on the assessed lifetime;
   simulating, using the one or more processing circuits applying the single-parameter model or the multi-parameter model, a continuously evolving carbon gain at a specified time interval; and
   displaying, with one or more display screens, the simulated continuously evolving carbon gain to users.

2. The method of claim 1, further comprising cost optimization to minimize a cost function J:

$$J(x,y)=J(x_1,x_2,x_3,\ldots,y_1,y_2,y_3,\ldots)$$

wherein, $x=x_1, x_2, x_3, \ldots$ is a vector of multiple factors that impact cost of sourcing wood, $y=y_1, y_2, y_3, \ldots$ is vector defining a total value of a forest, including value of the sequestered carbon, or alternative use values for lumber or paper, co-benefits of fire prevention; wherein, carbon storage in time relative to a baseline or other wood use methods, $y_1=y_1$ (species, climate factors, harvest frequency, regeneration strategy, fire prevention); calculated using semi-empirical forest growth models, or carbon cycle models; or, forestry gap models are used to simulate multi-species multi-age forest stand, useful for selective cutting strategy and forest management;
performing an optimization procedure with input of different usages and parameter values to find a best overall value relative to cost, that is, to minimize the cost function J, by taking a derivative of the cost function zero:

$$\frac{\partial J}{\partial x} = 0, \frac{\partial J}{\partial y} = 0;$$

and
performing iterative methods to allow different sub-models to converge.

3. The method of claim 2, further comprising a data assimilation for the carbon accounting, wherein data assimilation inputs are observations $y^o$, ensemble forecast $x_k^b(t)$ =M($x_k^a$(t−1))) with mean $\bar{x}^b$, and forecast of the observations $y_k^b$=h($x_k^b$), where M represents a full nonlinear model, k is an index for model ensemble member, h is an 'observation operator' that 'maps' model prediction onto observation space in order to compute an observation model error covariance $y^o$−h($x_k^b$), which is an ensemble filter in which the observations are assimilated to update only an ensemble mean while ensemble perturbations $x_k^b$−$\bar{x}^b$ are updated by transforming forecast perturbations through a transform matrix:

$\bar{x}^a = \bar{x}^b + X^b \tilde{P}^a (HX^b)^T R^{-1} [y^o − h(\bar{x}^b)]$ $X^a = X^b [(K-1)\tilde{P}^a]^{1/2}$;

wherein K is a total number of ensemble members, $X^a$, $X^b$ are perturbation matrices whose columns are the analysis and forecast ensemble perturbations, respectively; $X^b$ is updated every analysis time step, such that a forecast error covariance $$P^b = \frac{1}{K-1} X^b X^{bT}$$

is flow-dependent;
wherein $\tilde{P}^a$, the an analysis error covariance in ensemble space, is given by $\tilde{P}^a = [(K-1)I + (HX^b)^T R^{-1} (HX^b)]^{-1}$, which has a dimension K by K, substantially smaller than both a model dimension and a number of observations.

4. The method of claim 3, further comprising: prior to the storing the wood, treating wood with chemical and physical methods through pressure treatment, liquid preservatives or charring before wood is stored to prolong preservation time.

5. The method of claim 4,
wherein a following formula is utilized to describe factors influencing a decomposition rate D of the stored wood, including moisture w, temperature T, oxygen level O, and surface area A:

$D = D_0 D_1(w) D_2(T) D_3(O) D_4(A)$;

wherein $D_0$ is a basic decomposition rate that is tree species dependent, while D1-D4 are relative or normalized.

6. The method of claim 5, wherein
for the moisture w dependence, $$D_1(w) = \frac{d_0 + \exp\left(-\left(\frac{w_0 - w}{w_1}\right)^{n_1}\right)}{d_0 + 1}, \text{ if } w \leq w_0$$

$$= \frac{d_0 + \exp\left(-\left(\frac{w - w_0}{w_2}\right)^{n_2}\right)}{d_0 + 1}, \text{ if } w > w_0$$

for the temperature I dependence, $$D_2(T) = \exp\left(-\left(\frac{T_0 - T}{T_1}\right)^{n_1}\right), \text{ if } T \leq T_0$$

$$= \exp\left(-\left(\frac{T - T_0}{T_2}\right)^{n_2}\right), \text{ if } T > T_0;$$

for both temperature and moisture dependence, the decomposition rate D is small at low values, but reaches an optimal value of $w_0$ or $T_0$, and decreases at high values;

for dependence on the oxygen level O, a logistic function is used, $$D_3(O) = \frac{O^\alpha}{O_0^\alpha + O^\alpha}$$

where $O_0$ is ambient oxygen concentration at 21%, and α determines a sensitivity at extremely low oxygen values when the decomposition rate D is slow;
for dependence on the surface area A, $$D_4(A) = \left(\frac{A}{A_0}\right)^b$$

where $A_0$ is surface area of original whole raw wood logs; woodchips have a total surface area much larger than logs (A>>$A_0$) for a same mass; $D_4$ is relative to the decomposition rate of the original whole raw wood logs; b represents the impact of effective surface area, and is less or equal to 1.

7. The method of claim 1, further comprising: burying wood underground in-situ on a forest floor, including:
burying wood directly under soil without sealing where soil texture is of low permeability, and water level fluctuation and water flow are avoided, and the wood is placed either always under a water level, i.e., below the water level of dry season or always above the water level, i.e., above the water level at wet season; or,
where water level fluctuation and water flow cannot be avoided, sealing a wood burial chamber fully in clay, synthetic liner or other impermeable materials to avoid aeration and oxygenation; or,
where the wood is buried above a highest seasonable water table, sealing a top and upslope side of the wood burial chamber; or
where the wood is buried underground below water table but there is significant lateral flow due to topographical gradient or other causes as in mountainous, piedmont, or undulating hilly regions, sealing an upslope side of the wood burial chamber to divert the lateral flow around or below the wood burial chamber;
burying the wood for carbon storage while driving log piles into muddy soil as foundations to support buildings, as a way to lower cost of construction, for developing or renovating/raising cities.

8. The method of claim 7, further comprising: burying the wood semi-above ground on a slope in-situ on the forest floor, wherein, the up-slope side is cut to create room for wood burial and the top and upslope side of the wood burial chamber are sealed with soil.

9. The method of claim 8, further comprising: burying the wood above ground in-situ on the forest floor, wherein, a shelter with a roof is constructed.

10. The method of claim 9, further comprising: building a large-scale storage facility off-site for above ground or semi-above ground storage including:
selecting a suitable site of size commensurate estimated sustainable rate of wood source from anticipated surrounding regions; wherein, suitability of the site is based on assessment of site characteristics, including at least one of topography, hydrology, climate, environment, or economics;

excavating soil to form a pit, with the soil laid on side, further separating top organic soil to be put back on top last;

dividing the pit into multiple sections with sizes optimized based on balancing wood sourcing rate and engineering cost; covering each section with a layer of soil or fire-resistant synthetic liner;

transporting wood materials of different durability to fill different sections;

covering each section with a layer of soil having a low permeability; or, piling up wood fully above ground where water table is shallow and fluctuates significantly; or, where topographical slope is significant, lining upslope-facing side to prevent water from moving laterally through buried wood in order to minimize episodic reoxygenation; wherein a base of the pit is above the local water table at its highest level to avoid fluctuating water-air boundary bringing oxygen;

facilitating grass or trees with shallow roots to grow back.

11. The method of claim 1, further comprising: building an off-site large-scale burial facility for storage underground, including:

burying the wood completely underground without sealing below a lowest level of fluctuating water table where the water table is near surface;

lining upslope direction with clay or synthetic liner to minimize water flow in the burial chambers where there is strong one directional flow; and optionally, build a burial mound on top of a wood pit for burying and storing human remains, operated as a green burial graveyard.

12. The method of claim 1, further comprising burying wood under water including:

determining and selecting stagnant and anaerobic water bodies for wood burial, or diverting flowing water before wood burial;

collecting logs from surrounding regions, rafting or transporting wood to the water bodies for sinking to bottom of the water bodies.

13. The method of claim 1, further comprising dry storage; wherein, wood is locally sourced or transported to dry regions and stored underground or in small or large scale above-ground storage facilities.

14. The method of claim 1, further comprising cold storage including:

sourcing wood from different regions;

collecting, bundling, and transporting wood to ports;

loading wood bundles onto container ships/barges at the ports, then shipping the wood bundles to Antarctica;

piling the wood bundles from ground not part of icesheet or iceshelf to avoid damage and moving due to ground movement.

15. The method of claim 1, further comprising: wood storage project evaluation, monitoring, verification and certification based on:

trench/mound burial conditions evaluated based on factors including depth of topsoil, permeability of soil, infertility of soil, dimension of trench, biomass and carbon content of buried wood and regrowth and maintenance condition on surface;

surrounding burial site condition for preservation evaluated based on site climatological temperatures;

burial site environmental impact factors;

mass and carbon amount of wood stored calculated;

wherein, both quantitative measures and qualitative criteria are produced as follows:

amount of carbon sequestered;

an estimated longevity range of buried carbon in years;

an environmental soundness indicator is provided as: excellent, good, fair, poor;

main categories of evaluation outcome reported as:

carbon stored;

distributed or centralized storage;

permanence;

cost; and environmental and societal impact.

* * * * *